(12) United States Patent
Cervantes et al.

(10) Patent No.: US 11,714,832 B2
(45) Date of Patent: Aug. 1, 2023

(54) METHOD, APPARATUS, AND SYSTEM FOR COMBINING LOCATION DATA SOURCES

(71) Applicant: HERE Global B.V., Eindhoven (NL)

(72) Inventors: Christopher Cervantes, Chicago, IL (US); Srikrishna Kompella, Oak Park, IL (US)

(73) Assignee: HERE Global B.V., Eindhoven (NL)

( * ) Notice: Subject to any disclaimer, the term of this patent is extended or adjusted under 35 U.S.C. 154(b) by 160 days.

(21) Appl. No.: 17/116,756

(22) Filed: Dec. 9, 2020

(65) Prior Publication Data

US 2022/0179882 A1 Jun. 9, 2022

(51) Int. Cl.
| | |
|---|---|
| *G06F 17/00* | (2019.01) |
| *G06F 16/28* | (2019.01) |
| *G06N 5/04* | (2023.01) |
| *G06N 20/00* | (2019.01) |
| *G06F 16/22* | (2019.01) |

(52) U.S. Cl.
CPC ........ *G06F 16/285* (2019.01); *G06F 16/2237* (2019.01); *G06N 5/04* (2013.01); *G06N 20/00* (2019.01)

(58) Field of Classification Search
CPC .... G06F 16/285; G06F 16/2237; G06F 16/29; G06N 5/04; G06N 5/025; G06N 20/00; G06N 7/005; G06N 3/0454; G06N 3/08; G06N 3/045; G06N 7/01
See application file for complete search history.

(56) References Cited

U.S. PATENT DOCUMENTS

| | | | |
|---|---|---|---|
| 2019/0325068 A1* | 10/2019 | Lai | G06F 16/583 |
| 2021/0319007 A1* | 10/2021 | Guggilla | G06Q 30/01 |
| 2022/0164683 A1* | 5/2022 | Hao | G06F 16/252 |

OTHER PUBLICATIONS

Kai Wang et al., MulDE: Multi-teacher Knowledge Distillation for Low-dimensional Knowledge Graph Embeddings. In Proceedings of the Web Conference 2021. Association for Computing Machinery,1716-1726. <https://doi.org/10.1145/3442381.3449898>,Apr. 2021.*
Bordes et al., "Translating embeddings for modeling multi-relational data." Advances in neural information processing systems. 2013, 9 pages.
Wang et al., "Knowledge graph embedding by translating on hyperplanes." AAAI. vol. 14. No. 2014. 2014, 8 pages.

(Continued)

*Primary Examiner* — Greta L Robinson
(74) *Attorney, Agent, or Firm* — Ditthavong, Steiner & Mlotkowski

(57) ABSTRACT

An approach is provided for combining location data sources. The approach, for instance, involves generating a first context-aware vector representation of a first location entity in a first data source and a second context-aware vector representation of a second location entity in a second data source. The approach also comprises processing the first context-aware vector representation and the second context-aware vector representation using a machine learning model to perform a classification of the first location entity as the same as the second location entity. The approach further comprises combining the first data source and the data source into a new database based on the classification and providing the new database as an output.

20 Claims, 19 Drawing Sheets

(56) References Cited

OTHER PUBLICATIONS

Lin et al., "Learning entity and relation embeddings for knowledge graph completion." Twenty-ninth AAAI conference on artificial intelligence. 2015, 7 pages.
Ji et al., "Knowledge graph embedding via dynamic mapping matrix." Proceedings of the 53rd annual meeting of the Association for Computational Linguistics (ACL). 2015, 10 pages.
Nathani et al.,"Learning attention-based embeddings for relation prediction in knowledge graphs." (2019), 10 pages.
Nguyen et al., "A novel embedding model for knowledge base completion based on convolutional neural network." (2017), 7 pages.

* cited by examiner

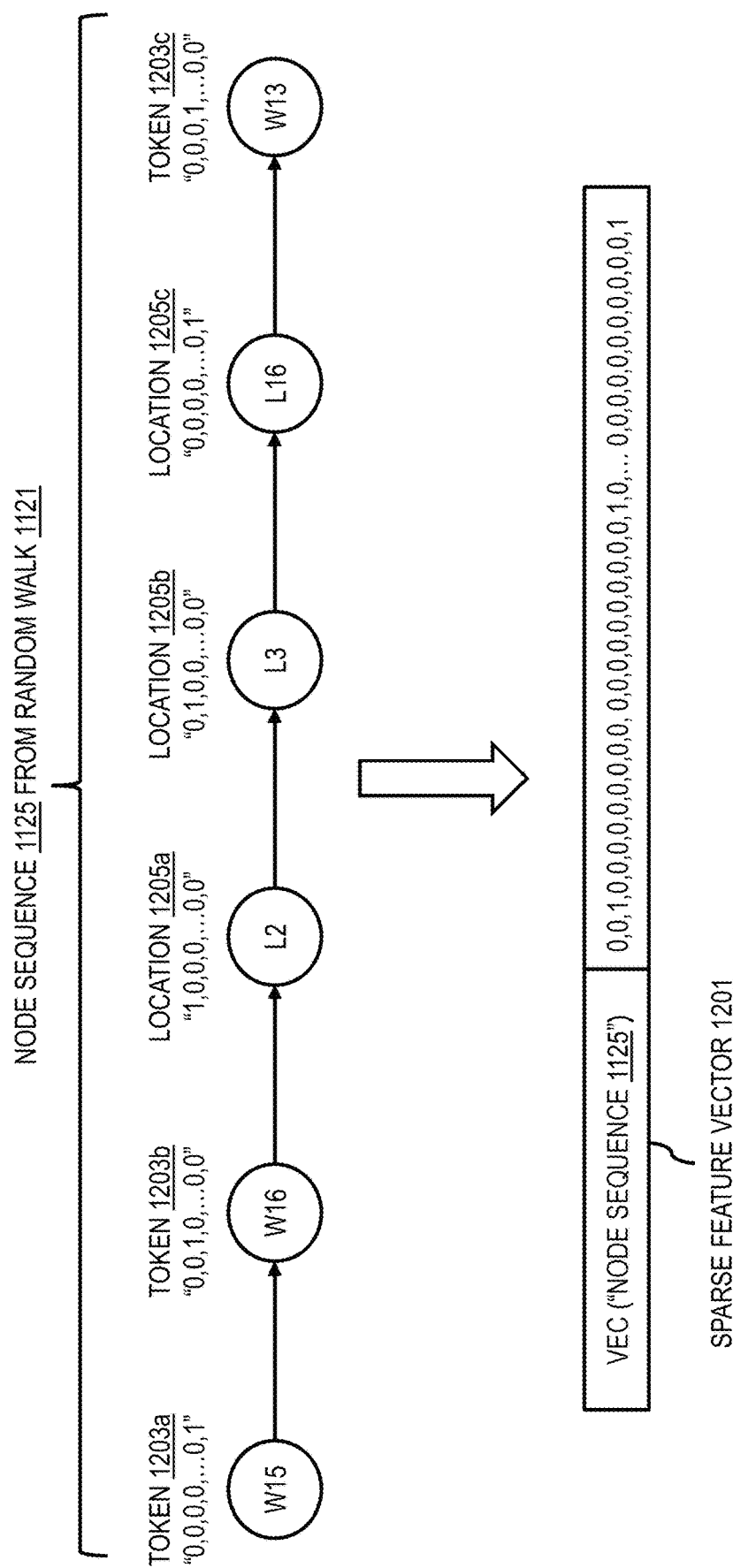

METHOD, APPARATUS, AND SYSTEM FOR COMBINING LOCATION DATA SOURCES

BACKGROUND

Mapping and navigation service providers often have customers or users who have their own internal location data that they would like to use in conjunction with the location data provided by the service providers themselves. However, there are generally significant differences or variations between the customer/user location data and service provider location data (e.g., differences in ontology, format, accuracy, etc.). As a result, service providers face significant technical challenges to reconcile those differences and enable the different data sources to be combined for use in location-based services and applications.

SOME EXAMPLE EMBODIMENTS

Therefore, there is a need for enabling third-party data sources to be used in conjunction with existing data sources (or more generally for a first data source to be used in conjunction with a second data source) and/or for discovering new relations between location entities in the resulting data source.

According to one embodiment, a method comprises generating a first context-aware vector representation of a first location entity in a first data source and a second context-aware vector representation of a second location entity in a second data source. The method also comprises processing the first context-aware vector representation and the second context-aware vector representation using a machine learning model to perform a classification of the first location entity as the same as the second location entity. The method further comprises combining the first data source and the data source into a new database based on the classification. The method further comprises providing the new database as an output.

According to another embodiment, an apparatus comprises at least one processor, and at least one memory including computer program code for one or more computer programs, the at least one memory and the computer program code configured to, with the at least one processor, cause, at least in part, the apparatus to generate a first context-aware vector representation of a first location entity in a first data source and a second context-aware vector representation of a second location entity in a second data source. The apparatus is also caused to process the first context-aware vector representation and the second context-aware vector representation using a machine learning model to perform a classification of the first location entity as the same as the second location entity. The apparatus is further caused to combine the first data source and the data source into a new database based on the classification. The method is further caused to provide the new database as an output.

According to another embodiment, a non-transitory computer-readable storage medium carries one or more sequences of one or more instructions which, when executed by one or more processors, cause, at least in part, an apparatus to generate a first context-aware vector representation of a first location entity in a first data source and a second context-aware vector representation of a second location entity in a second data source. The apparatus is also caused to process the first context-aware vector representation and the second context-aware vector representation using a machine learning model to perform a classification of the first location entity as the same as the second location entity. The apparatus is further caused to combine the first data source and the data source into a new database based on the classification. The method is further caused to provide the new database as an output.

According to another embodiment, an apparatus comprises means for generating a first context-aware vector representation of a first location entity in a first data source and a second context-aware vector representation of a second location entity in a second data source. The apparatus also comprises means for processing the first context-aware vector representation and the second context-aware vector representation using a machine learning model to perform a classification of the first location entity as the same as the second location entity. The apparatus further comprises means for combining the first data source and the data source into a new database based on the classification. The apparatus further comprises means for providing the new database as an output.

According to one embodiment, a method comprises creating a knowledge graph of a plurality of location entities of a database. The method also comprises enriching the knowledge graph with multi-modal data. The method further comprises creating a plurality of node embeddings to respectively represent the plurality of location entities based on the enriched knowledge graph. The method further comprises using a machine learning model to predict a relation between any two location entities of the new database based on the plurality of node embeddings. The method further comprises providing the relation as an output.

According to another embodiment, an apparatus comprises at least one processor, and at least one memory including computer program code for one or more computer programs, the at least one memory and the computer program code configured to, with the at least one processor, cause, at least in part, the apparatus to create a knowledge graph of a plurality of location entities of a database. The apparatus is also caused to enrich the knowledge graph with multi-modal data. The apparatus is further caused to create a plurality of node embeddings to respectively represent the plurality of location entities based on the enriched knowledge graph. The apparatus is further caused to use a machine learning model to predict a relation between any two location entities of the new database based on the plurality of node embeddings. The apparatus is further caused to provide the relation as an output.

According to another embodiment, a non-transitory computer-readable storage medium carries one or more sequences of one or more instructions which, when executed by one or more processors, cause, at least in part, an apparatus to create a knowledge graph of a plurality of location entities of a database. The apparatus is also caused to enrich the knowledge graph with multi-modal data. The apparatus is further caused to create a plurality of node embeddings to respectively represent the plurality of location entities based on the enriched knowledge graph. The apparatus is further caused to use a machine learning model to predict a relation between any two location entities of the new database based on the plurality of node embeddings. The apparatus is further caused to provide the relation as an output.

According to another embodiment, an apparatus comprises means for creating a knowledge graph of a plurality of location entities of a database. The apparatus also comprises means for enriching the knowledge graph with multi-modal data. The apparatus further comprises means for creating a plurality of node embeddings to respectively represent the plurality of location entities based on the enriched knowledge graph. The apparatus further comprises means for using a machine learning model to predict a relation between any two location entities of the new database based on the plurality of node embeddings. The apparatus further comprises means for providing the relation as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 12 is a diagram illustrating an example of encoding a sparse feature vector based on a node sequence generated from a random walk of a hypergraph, according to one embodiment;

DESCRIPTION OF SOME EMBODIMENTS

Examples of a method, apparatus, and computer program for combining different location data sources and discovering new relationships in the data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
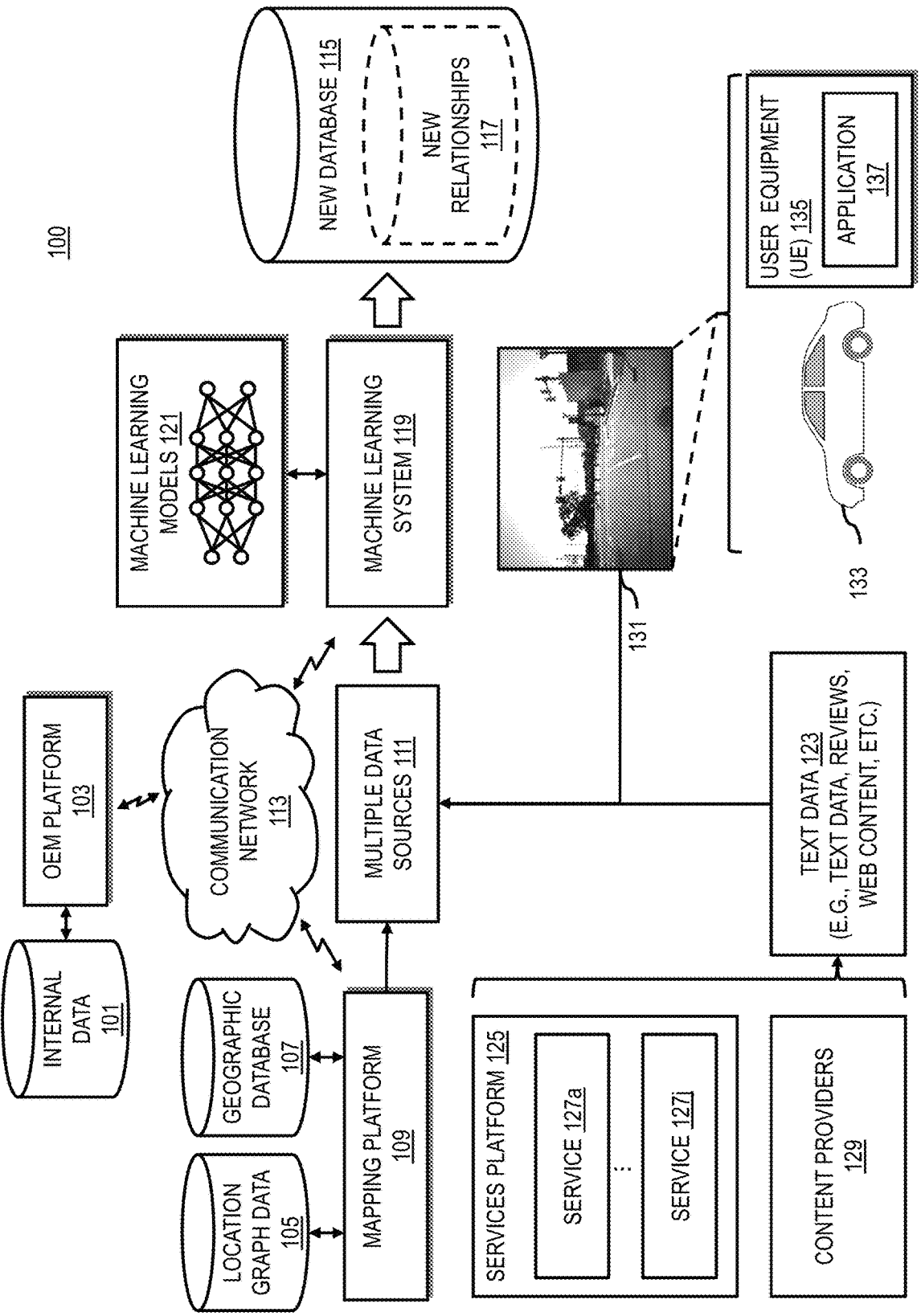
FIG. 1 is a diagram of a system capable of combining different location data sources, according to one embodiment.

FIG. 1 is a diagram of a system 100 capable of combining different location data sources, according to one embodiment. The various embodiments described herein provide an approach to address the task of enabling customers to use their internal data (e.g., internal location data 101 provided by an automobile original equipment manufacturer (OEM) via an OEM platform 103) in conjunction with mapping service provide data (e.g., location graph data 105 such as a Knowledge Graph (KG) or digital map data of a geographic database 107 provided by a service provider mapping platform 109) by matching similar entities of multiple data sources 111 (e.g., internal data 101, location graph data 105, geographic database 107, etc.) and discovering new relationships.

In general, graphs can represent interactions between entities. By way of example, there can be graphs for social networks, transportation systems, protein structures, and so on. Link prediction can be applied to these graphs to analyze and solve problems like protecting privacy, detecting spam, suggesting alternate routes based on traffic, and so on. In particular, KGs are graphs that specifically describe how entities (e.g., physical objects and abstract concepts) relate to one another. They can be used to understand and represent these relationships. In a question answering use case, for example, "Where was the 44th president born?" requires the retrieval of two relational pieces of information: "44th president" SAME_AS "Obama" and "Obama" BORN_IN "Hawaii". In this example, "SAME_AS" and "BORN_IN" are two different relations or relationship types that are defined in the data source. The relationships types of a data source represent the ontology of the corresponding KG. Each different data source and/or domain under which the data source falls can use different ontologies to describe the relationships between entities of a KG.

Moreover, the applications of a location-based ontology are diverse, and include but are not limited to search, question answering, and bring your own data (BYOD) cases. Any task that uses a nuanced semantic understanding of locations is a task for which KGs have a role and predicting relationships between entities can be a component to any system in which KGs are a part. In a BYOD use case, while service provider location data (e.g., location graph data 105 and/or geographic database 107 of the mapping platform 109) is generally extensive and detailed, its customers or users (e.g., OEM platform 103 with connectivity to the mapping platform 109 over a communication network 113) may still choose to collect and maintain related proprietary data or data attributes (e.g., internal data 101) for strategic purposes.

Accordingly, because of the BYOD use case and the diversity of the multiple data sources 111 (e.g., diversity in ontologies, applications, etc.), service providers face significant technical challenges with respect to combining the multiple data sources 111.

To address these technical challenges, the system 100 of FIG. 1 introduces a capability to simplify the process of combining the two data sources (e.g., in a BYOD use case) by solving the problems in two steps:

(1) Matching common entities between multiple data sources 111 (e.g., to generate a new database 115 that represents a combination of the multiple data sources 111); and (2) Enriching the data (e.g., the new database 115) by discovering new relationships 117.

The new database 115 (combined database) will then contain data records of the multiple data sources 111 such that matched location entities between the multiple data sources 111 are marked as being the same entity (e.g., correlated with a relationship indicator "SAME_AS" or equivalent). The new database 115 can be combined according to any data structure such as, but not limited to, any data structure of a selected one of the multiple data sources 111. For example, if the internal data 101 from an OEM platform 103 is combined with the geographic database 107 of the mapping platform 109, the new internal data 101 can be ingested into the data structure of the geographic database 107 (e.g., the structure as described with respect to FIG. 15 below).

In one embodiment, given the combined data (e.g., the new database 115), there is a potential to discover new relationships 117 in the data. For example, if one data source has data records that stores "Obama" BORN_IN "Hawaii" and "POTUS" SAME_AS "Obama" and a second data source has a data record that "POTUS" LIVES_IN "White House", the combined data would match the "Obama" and "POTUS" as the same entity. For the combined data, the system 100 can then determine a new relationship "Obama" LIVES_IN "White House". In this way, the system 100 advantageously enables users more effectively utilize the data that they are bringing in despite differences in ontologies, entity names, etc.

In one embodiment, the system 100 uses a machine learning approach to combine different data sources and predict new relationships in the data. As shown, the system 100 includes a machine learning system 119 and one or more machine learning models 121 that are trained according the various embodiments to use the context (e.g., spatial and semantic neighbors) of a location entities of different data sources to perform entity matching and/or relationship prediction according to the embodiments described. In one embodiment, the system 100 can determine the spatial and/or semantic contexts of location entities using multi-modal relational location data determined from various components of the system 100. For example, the data can include but is not limited to: (1) internal data 101 from the OEM platform 103; (2) location graph data 105 and/or geographic database 107 from the mapping platform 109; (3) text data 123 (e.g., text, reviews, web content, etc.) from a services platform 125, one or more services 127a-127j of the services platform 125, and/or one or more content providers 129; and image data 131 (e.g., street level imagery) captured by vehicles 133 and/or user equipment devices 135 executing imaging-capable applications 137.

In the context of locations, determining the relationship between "Green Door Tavern" and "tavern" may seem trivial, but a functional KG combined with modern machine learning approaches according to the embodiments described herein can learn semantic relationships between any arbitrary pair of entities. For example, if the machine learning system 119 knows that "Green Door Tavern" is a tavern and restaurant, it may also be able to predict whether it is "family friendly" without explicitly defining what that means. In one embodiment, the machine learning system 119 can train a machine learning model 121 to understand the world as represented by an ontology (e.g., associated with one or more of the multiple data sources 111) and ask the trained machine learning model 121 to predict new relationships between entities or other related data attributes given minimal additional data.

In summary, the system 100 can combine two related sources of data (e.g., multiple data sources 111) and predict new relationships. In the first task, the system 100, for instance, returns a probability that two entities are identical, and in the second task, the system 100 returns a score of the probability of a specific relationship between them or any other two entities.

When applied, the various embodiments of the system 100 described herein can be used to create new relationships between previously-undefined categories and/or previously unknown location entities (e.g., points-of-interest (POIs)). The system 100 can do so automatically using a simple neural model (or any other equivalent machine learning model 121) trained on a representative set of training data. The embodiments of the machine learning approach to entity matching and relationship prediction advantageously results in trained machine learning models 121 that are effective at generalizing to new data.

Figure 2:
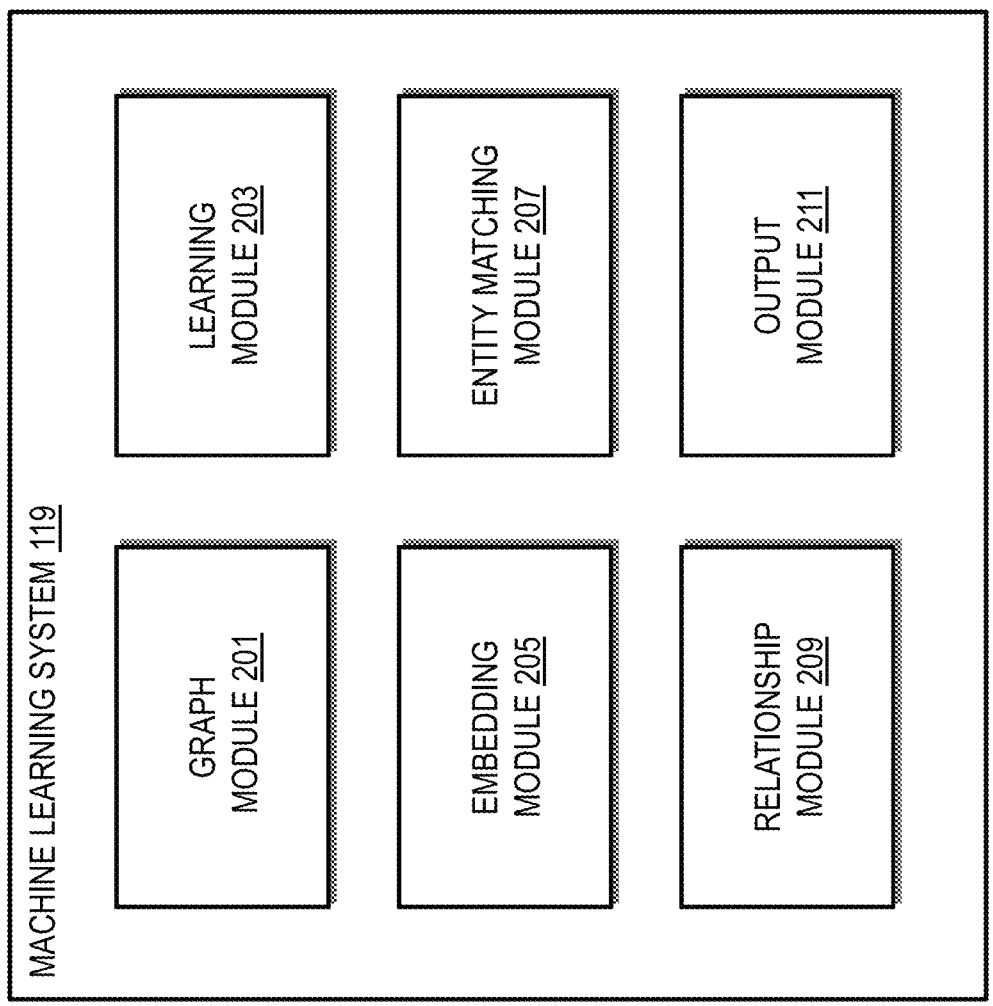
FIG. 2 is a diagram of components of a machine learning system capable of combining different location data sources, according to one embodiment.

In one embodiment, as shown in FIG. 2, the machine learning system 119 of the system 100 includes one or more components for providing a semantic-aware location representation based on enriched graphs according to the various embodiments described herein. It is contemplated that the functions of the components of the machine learning system 119 may be combined or performed by other components of equivalent functionality. As shown, in one embodiment, the machine learning system 119 includes a graph module 201, a learning module 203, an embedding module 205, an entity matching module 207, a relationship module 209, and an output module 211. The above presented modules and components of the machine learning system 119 can be implemented in hardware, firmware, software, or a combination thereof. Though depicted as a separate entity in FIG. 1, it is contemplated that the machine learning system 119 may be implemented as a module of any of the components of the system 100 (e.g., a component of the mapping platform 109, services platform 125, services 127, content providers 129, vehicles 133, UEs 135, and/or the like). In another embodiment, one or more of the modules 201-211 may be implemented as a cloud-based service, local service, native application, or combination thereof. The functions of the mapping platform 109 and modules 201-211 are discussed with respect to FIGS. 3-15 below.

Figure 3:
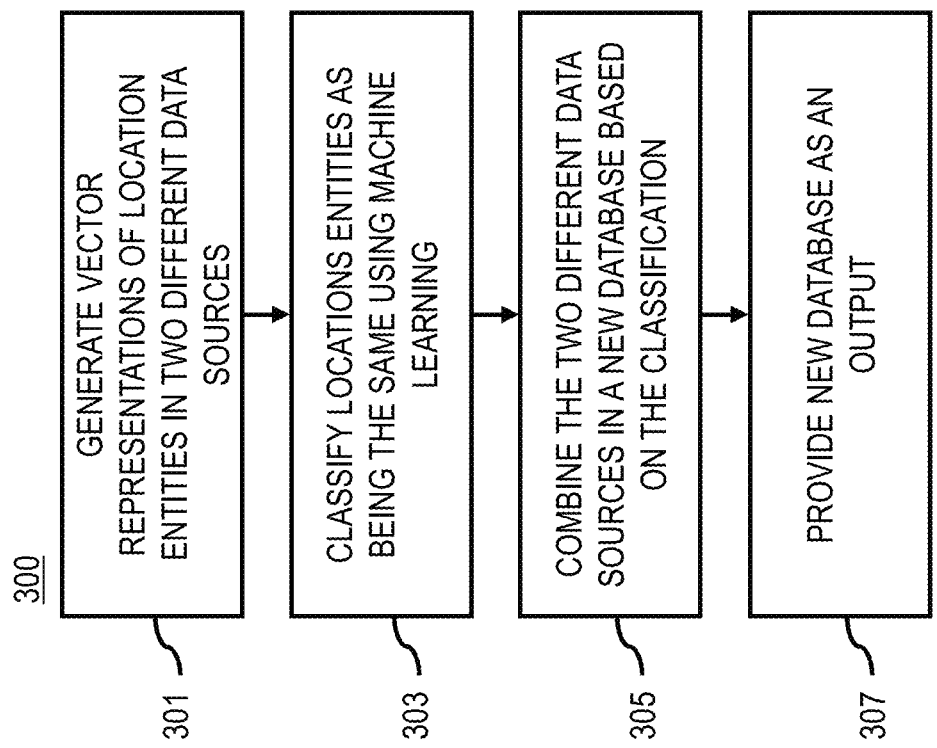
FIG. 3 is a flowchart of a process for performing location entity matching to combine different location data sources, according to one embodiment.
Figure 17:
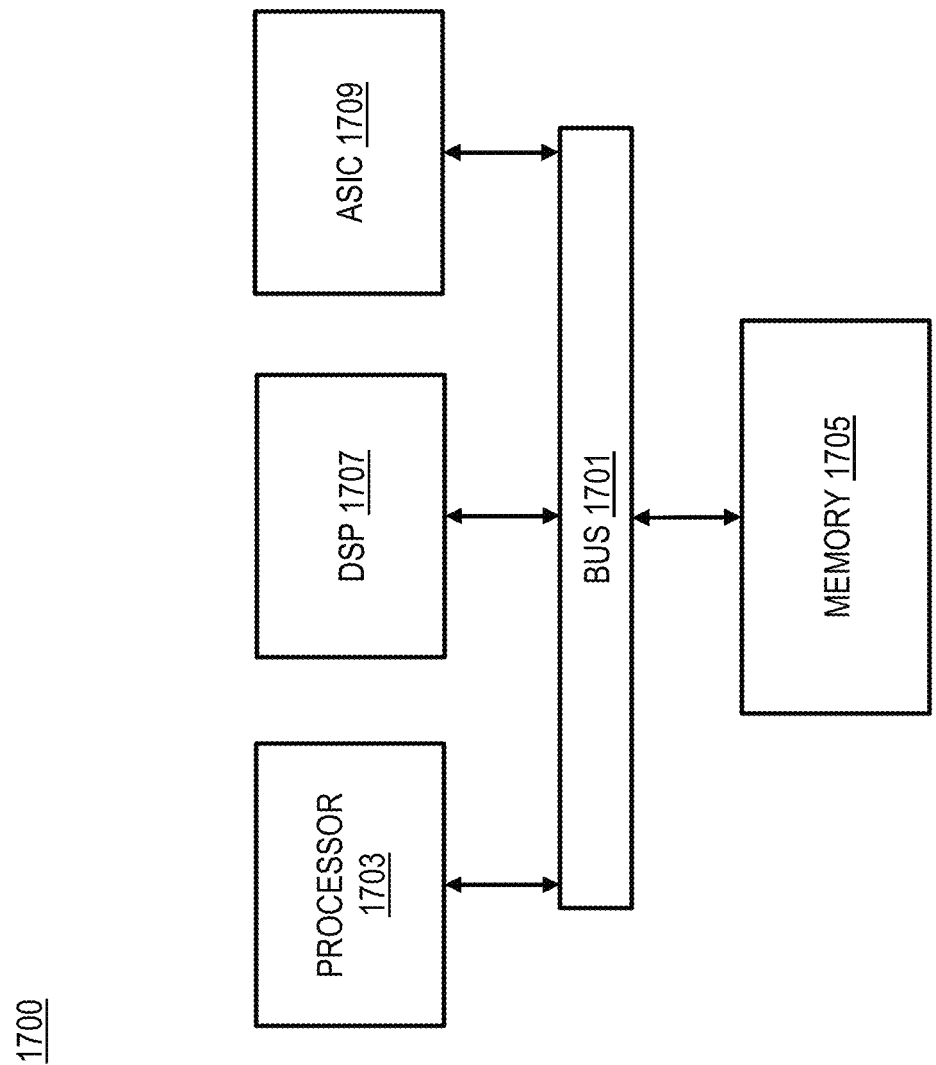
FIG. 17 is a diagram of a chip set that can be used to implement an embodiment of the processes described herein.

FIG. 3 is a flowchart of a process 300 for performing location entity matching to combine different location data sources, according to one embodiment. In various embodiments, the machine learning system 119 and/or any of the modules 201-211 may perform one or more portions of the process 300 and may be implemented in, for instance, a chip set including a processor and a memory as shown in FIG. 17. As such, the machine learning system 119 and/or any of the modules 201-211 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

The various embodiments of the process 300 described herein relate to entity matching between two data sources as a precursor to combining multiple data sources 111 (e.g., internal data 101 and geographic database 107) into a common data source (e.g., new database 115). In general, there will always be common entities (e.g., location entities such as POIs or other map features) between the two data sources. For example, a user's internal data 101 (e.g., a first data source) may include location entities in the same geographic area as the geographic database 107 of the mapping platform 109 (e.g., a second data source). Any location entities that are the same between the two data need to be combined in the new database 115 or otherwise related together with a SAME_AS relation (or any other equivalent relation type that indicates the location entities represented separately in the multiple data sources 111 are the same location/POI/map feature). This task is non-trivial as there can be more than one location entity with similar names and/or entities that are the same but have different names (e.g., either due to spelling error or due to alternative names).

To achieve this, the entity matching module 207 can use a mix of hand-engineered features and distributed text representations for obtaining a vector representation of an entity. In one embodiment, in step 301, the entity matching module 207 generates a first context-aware vector representation of a first location entity in a first data source and a second context-aware vector representation of a second location entity in a second data source. A context-aware vector representation includes, for instance, features related to the location entity itself as well as its neighboring location entities (e.g., neighboring with respect to spatial and/or semantic distance) to encode the context of the location entity in the vector representation.

The location entities to be matched can be selected as any respective location entities of the respective data sources. In addition or alternatively, the entity matching module 207 can use a set of heuristics to sample the possible candidates for a given target location entity, and thus advantageously reduce the number of such comparisons to make. In other words, the entity matching module 207 samples the first data source, the second data source, or a combination thereof to select a predetermined number of candidate location entities. The first location entity, the second location entity, or a combination thereof is selected from the predetermined number of candidate location entities. For example, the sampling heuristics can include, but is not limited to, using the location of a given location entity in a first data source as a spatial query to determine candidate entities in the second source that are to be compared for entity matching. Other heuristics can include but is not limited to determining that the entity names are related semantically, evaluating similarity of location attribute (e.g., POI types), and/or the like.

Figure 4:
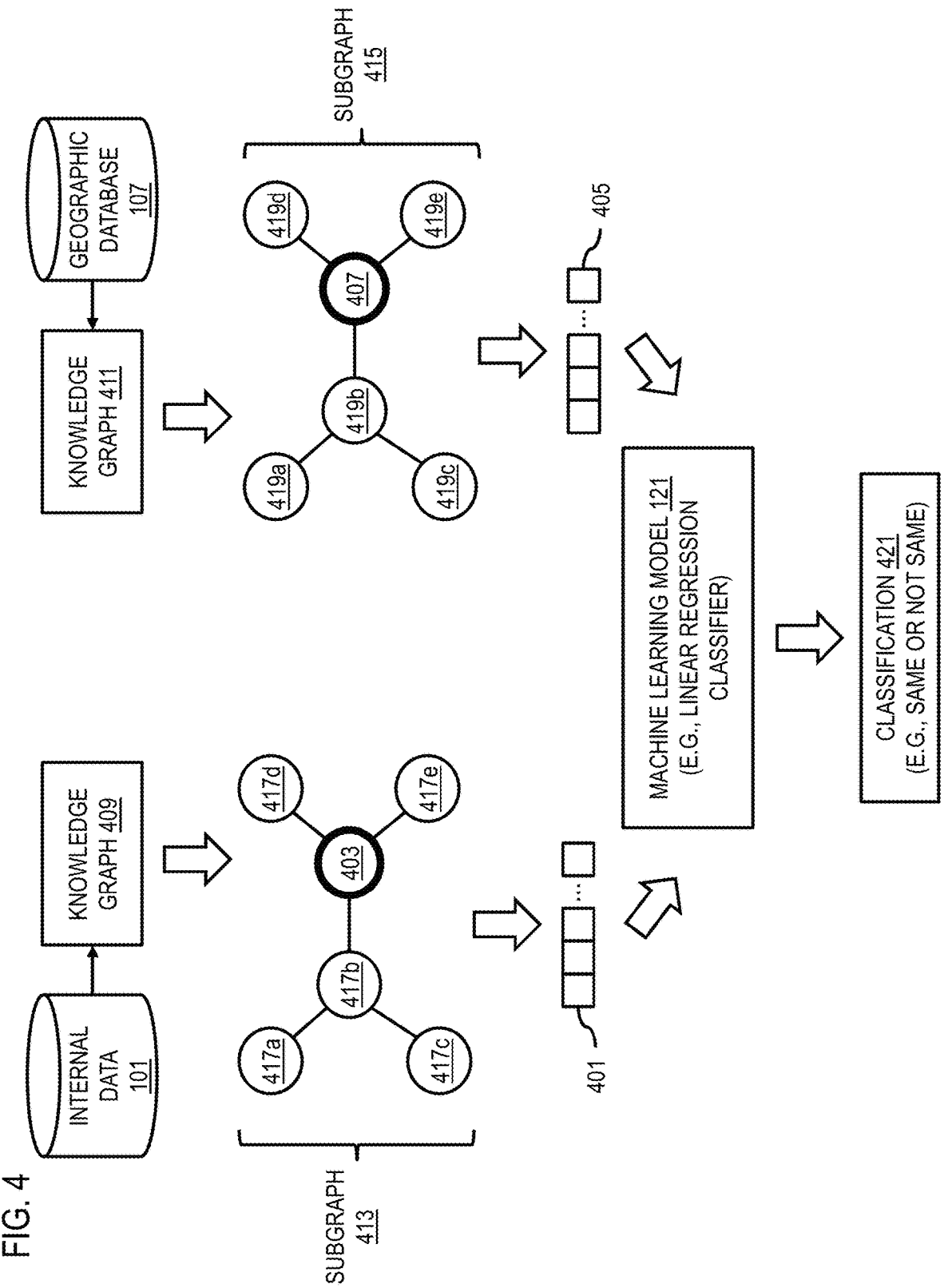
FIG. 4 is a diagram illustrating an example of location entity matching, according to one embodiment.

An example of creating the vector representations of location entities for machine-learning-based entity matching is illustrated in FIG. 4 which is a diagram illustrating an example of location entity matching based on context-aware vector representations, according to one embodiment. In the example of FIG. 4, two different location data sources (e.g., internal data 101 and geographic database 107) are to be combined based on entity matching. To start the entity matching process, the entity matching module 207 generates respective vector representations of the location entities from each data source that are to be evaluated for being the same (e.g., context-aware vector representation 401 of location entity 403 of the internal data 101, and context-aware vector representation 405 of location entity 407 of the geographic database 107).

In one embodiment, to generate the vector representations 401 and 403, the entity matching module 207 interacts with the graph module 201 to create knowledge graphs 409 and 411 respectively for the internal data 101 and geographic database 107. For example, the location data and/or digital map data of the internal data 101 and geographic database 107 can be respectively processed to generate a knowledge graphs 409 and 411 comprising location entities (e.g., POIs, places, terrain features, administrative areas, and/or any other stored cartography/map features at any geographic resolution) in each data source. The knowledge graphs 409 and 411, for instance, can represent all or just a designated portion of the respective location data sources that encompasses the respective location entities 403 and 407 of interest.

The knowledge graphs 409 and 411 can model relationships between location entities or objects in a variety of ways. Location entities and their relationships may be described using a set of labels (e.g., entity categories such as restaurant, park, office building, etc.). Location entities or objects may be referred to as "nodes" of the knowledge graphs 409 and 411 (e.g., represented as circles in FIG. 4) and the "edges" (e.g., represented as lines between nodes in FIG. 4) represent relationships between nodes, where the nodes and relationships among nodes may have data attributes. The organization of the knowledge graphs 409 and 411 may be defined by a data scheme which defines the structure of the data. The organization of the nodes and relationships may be stored in an ontology (e.g., in the internal data 101, location graph data 105, the geographic database 107, or external data source) which defines a set of concepts where the focus is on the meaning and shared understanding. These descriptions permit mapping of concepts from one domain to another.

In one embodiment, the data attributes associated with the nodes and/or edges of the knowledge graphs 409 and 411 may include multi-modal relational location data. The multi-modal relational location data includes, but is not limited to, geographic location data, relative location data, place category data, imagery data, text data, context data, or a combination thereof associated with the one or more location entities, a geographic area in which the one or more entities are located, or a combination thereof. In one embodiment, the multi-model relational location data can be retrieved from a third-party external semantic data source.

In other words, the knowledge graph 409 and 411 are graphs of nodes that are interrelated with relationships between the different nodes. As previously described, in a knowledge graph, the nodes are location entities or objects. For example, a node may be a POI such as a theater. Other nodes may include a first street, a second street, a parking lot, etc. Relationships may interconnect the nodes of the knowledge graphs 409 and 411, such as a relationship between the theater node and the first street may include a numerical address, where the numerical address is the relationship between the first street and the theater. A parking lot node may be affiliated with the theater node, and the relationship may be an indication of parking available for the theater. The relationship between the second street node and the theater node may include an entrance to the parking lot, such that the second street node is connected to the theater node by way of the parking lot node.

While example embodiments may include location entities as nodes, nodes may take many forms, including an event, for example. An event may be a node that includes a time (date/time), location, event type (e.g., sporting event), etc. That node may be related to the physical location of the event, transportation nodes, or other elements that have a contextual relationship with the event. The relationships or connections amongst the nodes of a location graph may be contextual links, whereby the relationships relate to how a node is connected to another node.

As shown in FIG. 4, respective portions of the knowledge graph 409 and 411 can be partitioned to create or otherwise designate subgraphs 413 and 415. Subgraph 413 comprises location entity 403 of interest (e.g., from the internal data 101) along with neighboring location entities 417a-417e to provide context to generate its vector representation 401. Similarly, subgraph 415 comprises location entity 407 of interest (e.g., from the geographic database 107) along with neighboring location entities 419a-419e to provide context to generate its vector representation 401. In one embodiment, the knowledge graphs 409 and 411 can also be represented as enriched distributed graphs (e.g., also referred to herein as hypergraphs) as illustrated below with the respect to FIGS. 11A and 11B below. In other words, the first context-aware vector representation, the second context-aware vector representation, or a combination thereof is generated based on respective distributed text representations of the first location entity, the second location entity, or a combination thereof. The multi-modal relational location data associated with the respective subgraphs 413 and 415 can then be encoded into input vectors (e.g., vector representations 401 and 403.

Figure 5:
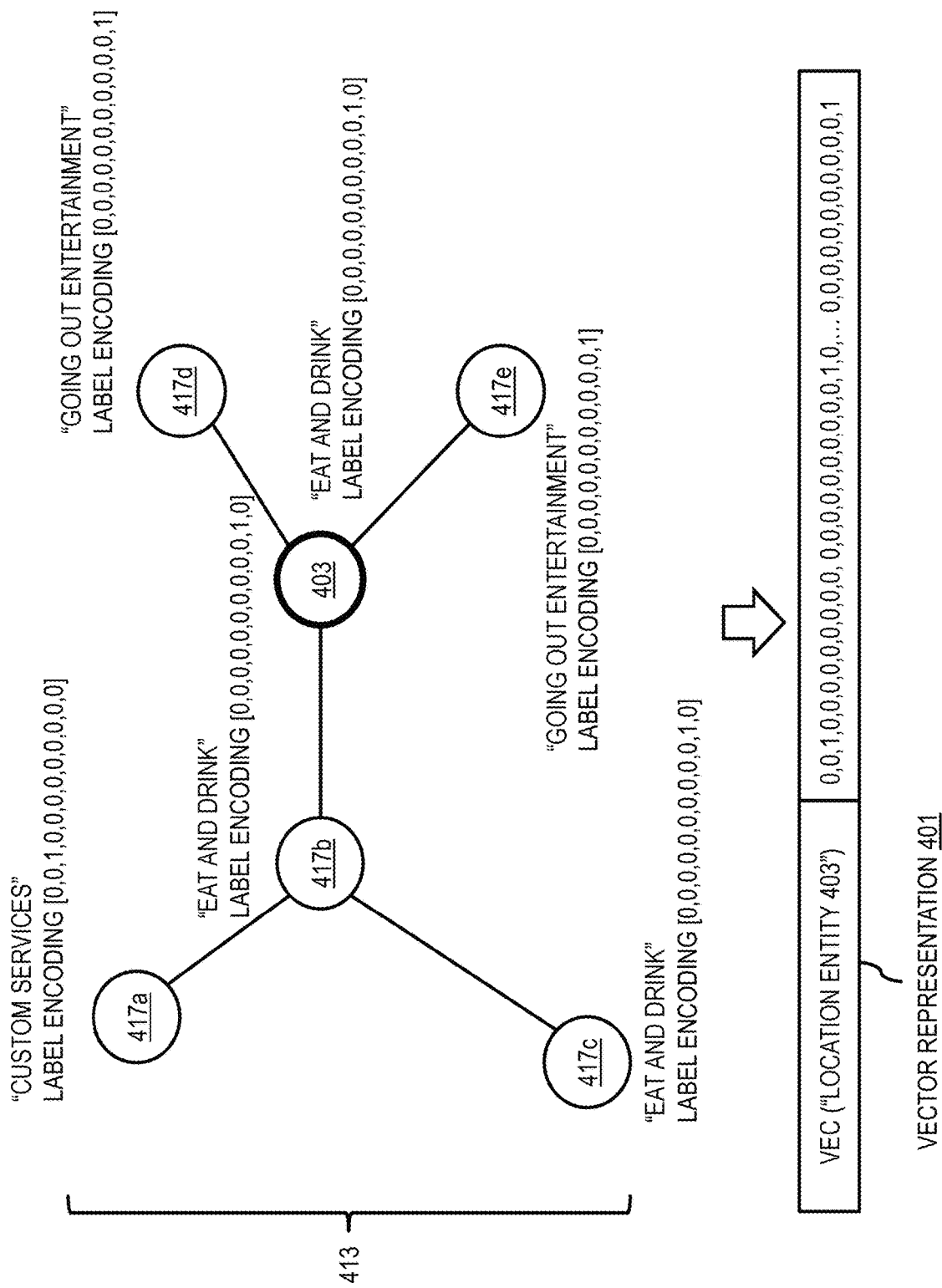
FIG. 5 is a diagram illustrating an example of generating a vector representation of a location entity from a location graph, according to one embodiment.

FIG. 5 is a diagram illustrating an example of generating a vector representation of a location entity 403 from a subgraph 413 from the example of FIG. 4, according to one embodiment. As shown, subgraph 413 comprises location entity 403 and neighboring location entities 417a-417d (e.g., neighboring based a spatial and/or semantic distance threshold) as respective nodes of the subgraph 413. Multi-modal relational location data associated with the subgraph 413 indicates, for instance, the place category of each node (e.g., "Custom services", "Eat and drink", and "Going out entertainment"). Each place category, in turn, is associated with a label encoding (e.g., encoded using one-hot encoding). The graph module 201 can process the subgraph 413 to create a context-aware vector representation 401 for the location entity 403 (e.g., vec ("location entity 403")) by concatenating the label encoding of the place category of each node of the subgraph 413. The vector representation 401 is sparse because the one-hot encoding results in a vector containing a value of 0 for the vast majority of the vector elements. In addition, the vector representation 401 is context-aware because it includes features extracted from neighboring location entities 417a-417e in addition of the corresponding location entity 403. Although not depicted, an analogous process as described with respect to FIG. 5 can be applied to the subgraph 415 of location entity 407 to generate the respective context-aware vector representation 405.

In step 303, the entity matching module 207 processes the first context-aware vector representation (e.g., representing a location entity of the first data source and generated according to the embodiments described herein) and the second context-aware vector representation (e.g., representing a location entity of the first data source and generated according to the embodiments described herein) using a machine learning model 121 to perform a classification 421 of the first location entity as the same as the second location entity or the first location entity as not the same as the second location entity as shown in FIG. 4. In one embodiment, the learning module 203 of the machine learning system 119 trains the machine learning model 121 to predict if two input entities (e.g., one from each data source to be combined) are the same or similar to each other or not. By way of example, the machine learning model 121 can be based on a linear regression classifier or any other equivalent machine learning model or approach. In one embodiment, the machine learning model 121 can output a probability that the first location entity is the same or not the same as the second location entity. The entity matching module 207 and/or the machine learning model 121 can then apply a probability threshold to determine the classification 421 (e.g., if probability of being the same entity is above the threshold, then the classification 421 is that the two entities are the same; and if the probability of being the same entity is below the threshold, then the classification 401 is that the two entities are not the same.

In step 305, the entity matching module 207 combines the first data source and the data source into a new database based on the classification. For example, if the classification indicates that a first location entity of the first data source is the same as a second location entity of the second data source, the entity matching module 207 can create a data record that indicates "first location entity" SAME_AS "second location entity" (or equivalent data record). This data record can then be stored in the either the first data source, the second data source, or a new database that includes all or a portion of the data from the first and second data sources. For example, if the internal data 101 combined with the geographic database 107 according to the embodiment described herein, the combined database would result in created the new database 115 comprising the combined data of the internal data 101 and the geographic database 107.

In step 307, the output module 211 provides the new database 115 as an output. For example, the new database 115 can be provided to any of the components of the system 100 including but not limited to the OEM platform 103 (or other user of the system 100), mapping platform 109, services platform 125, services 127, content providers 129, vehicles 133, UEs 135, and/or the like.

In one embodiment, the new database 115 can be further processed to determine new relationships among the location entities of the new database 115 that may become apparent based on the entity matching as described with respect to FIG. 6 below.

Figure 6:
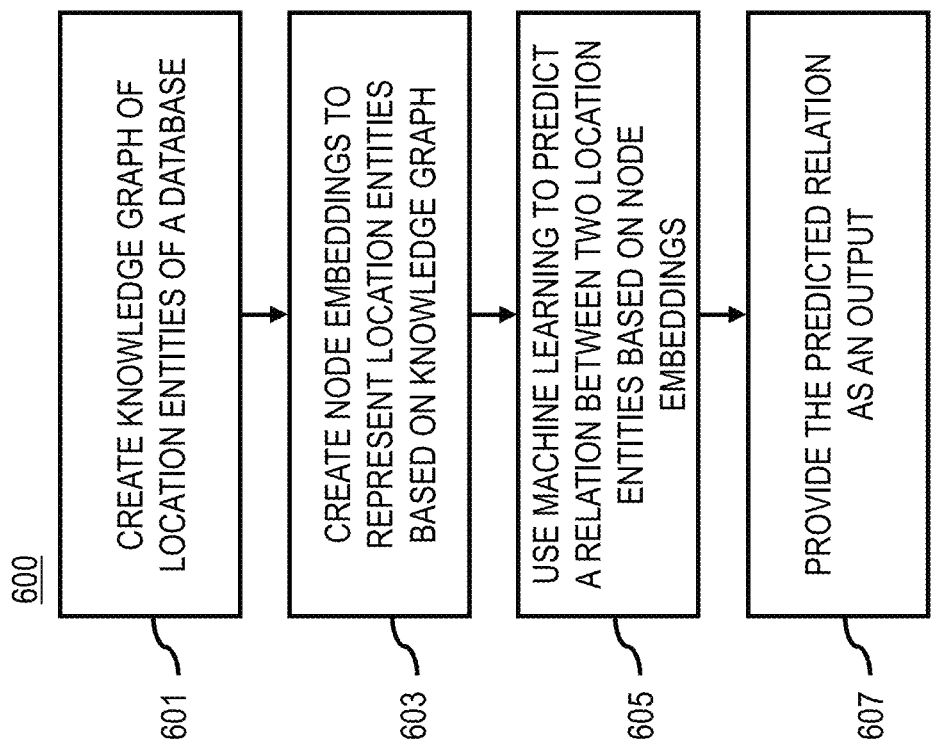
FIG. 6 is a flowchart of a process for predicting a relation between two location entities, according to one embodiment.

FIG. 6 is a flowchart of a process 600 for predicting a relation between two location entities, according to one embodiment. In various embodiments, the machine learning system 119 and/or any of the modules 201-211 may perform one or more portions of the process 600 and may be implemented in, for instance, a chip set including a processor and a memory as shown in FIG. 17. As such, the machine learning system 119 and/or any of the modules 201-211 can provide means for accomplishing various parts of the process 600, as well as means for accomplishing embodiments of other processes described herein in conjunction with other components of the system 100. Although the process 600 is illustrated and described as a sequence of steps, it is contemplated that various embodiments of the process 600 may be performed in any order or combination and need not include all of the illustrated steps.

In one embodiment, the process 600 can be performed in conjunction with the process 300 to discover new relationships among location entities combined into a new database 115 according to the various embodiments of entity matching described above. Alternatively, the process 600 can be performed on any data source to discover new relationships regardless of whether the data source is the result of combining or entity-matching.

As an overview, in one embodiment, the process 600 accepts the following inputs:

Knowledge graph (KG) for locations;
External text sources or other multi-modal data sources (e.g., image data 131) associated with KG entities; and
(Optionally) new entities (with associated text or other multi-modal data) for which new predictions are to be made.

Based on these inputs, the process 600 outputs the following:

Predictions (0-1; interpreted as a probability) for whether a relation between two location entities is plausible (e.g., likely to belong to the knowledge graph on which the model was trained). In one embodiment, the relation to predict is expressed as a triple (h, r, t) with "h" being a first or head location entity, "r" being a relation or relation type to evaluate, and "t" being a second or tail location entity.

In one embodiment, the process 600 uses a machine learning approach (e.g., neural approach) for ontology relation prediction for expressivity and generalizability over more data types. For example, with respect to the triple (h, r, t), the approach of the process 600 seeks to find the best entity t to which h relates via an r relation.

To initiate this relation prediction process, the relationship module 209 can represent location entities using enriched (e.g., text-enriched) graph or node embeddings. In step 601, to create the node or graph embeddings, the relationship module 209 interacts with the graph module 201 to create a knowledge graph of a plurality of location entities of a database and then enriches the knowledge graph with multi-modal data (e.g., text data 123, image data 131, etc.). For example, in order to learn a more nuanced understanding of graph entities, the graphing module 201 can associate nodes of the knowledge graph with multi-modal data such as, but not limited to, textual descriptions or other text data 123 from multiple sources (e.g., Wikipedia, Common Crawl, etc.). Additional details of an example embodiment for creating an enriched knowledge graph is described with respect to FIGS. 9-11A below.

In step 603, the relationship module 209 interacts with the embedding module 205 to create a plurality of node embeddings to respectively represent the plurality of location entities based on the enriched knowledge graph. In one embodiment, the embedding module 205 can create node embeddings as fixed-length, real-valued vectors which mathematically describe the entity such that similar entities (e.g., appearing in similar graph regions and/or associated with similar words/attributes) are "close" (e.g., the cosine distance of their vectors is below a threshold value). It is contemplated that the relationship module 209 can use any process to create or otherwise retrieve node embeddings for the location entities for which a relationship prediction is to be made. One example of a process for creating node embeddings includes, but is not limited to, the process described below with respect to FIGS. 8-14 below.

In one embodiment, the relationship module 209 can learn an intermediate representation of the one or more node embeddings of the location entities of interest using additional neural or machine learning approaches to extract or transform one or more elements or features of the node embeddings to different features that can provide for improved relationship prediction. For example, the relationship module 209 can generate one or more intermediate representations of the plurality of node embeddings associated with the triple based on one or more convolutions of the plurality of node embeddings associated with the triple (h, r, t). In one embodiment, convolutional filters are passed over node embeddings for triples (h, r, t) and max pooling is used to create fixed-length vectors for the triples. The convolutional filters can be selected to extract different types of relationships among the node embeddings of the triple (e.g., embeddings for the head entity, relation, and tail entity) as respective feature maps. The features maps are then concatenated or otherwise aggregated to generate the intermediate representations (e.g., using a ConvKB approach or any other equivalent knowledge base completion approach using convolutional neural networks).

In one embodiment, the relationship module 209 can optionally add additional explicit features (e.g., encoded node type, additional location data, etc.) to either the intermediate representation (if generated) or the original node embeddings of the location entities. In other words, the relationship module 209 can optional add one or more explicit features to the one or more intermediate representations or node embeddings (e.g., inserting the features as additional or replacement elements of the corresponding feature vectors) for a machine learning model to predict the relation or plausibility of the relation.

In step 605, the relationship module 209 can use a machine learning model (e.g., another machine learning model other than the model used for entity matching or node embedding generation) to predict a relation or plausibility of the relation between any two location entities of the new/combined database (or any other selected database) based on the plurality of node embeddings (or intermediate representations of the node embeddings) with or without additional explicit features. The relation can be any relation or relationship type specified in a location-based ontology. Examples of relations include, but are not limited to, LOCATED IN, NEXT TO, etc. As noted above, in one embodiment, the relation is predicted based on a triple comprising a head entity (h) and a tail entity (t) selected from the plurality of location entities, and wherein the head entity (h) is related to the tail entity (t) via the relation (r).

The machine learning model used for relationship prediction can be trained using standard ranking loss or equivalent to make predictions as a 0-1 score (e.g., representing a predicted probability) of whether a triple (h, r, t) (e.g., corresponding to a specified head location entity, relation, and tail entity to be evaluated) is plausible given the ground truth graph data on which the machine learning model was previously trained.

Figure 7:
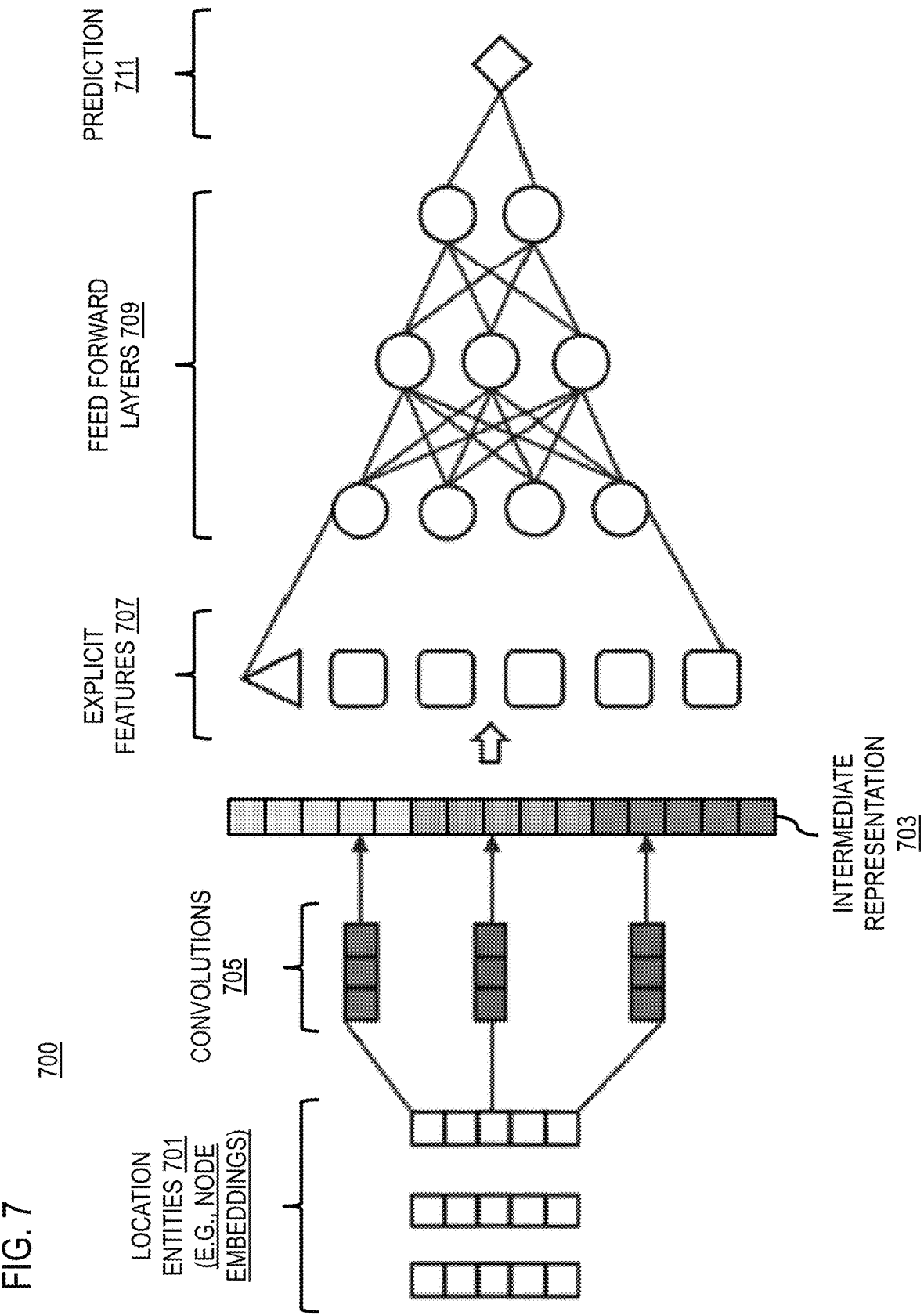
FIG. 7 is an example machine learning architecture for predicting a relation between two location entities, according to one embodiment.

FIG. 7 is an example machine learning architecture 700 for predicting a relation between two location entities, according to one embodiment. The example machine learning architecture 700 illustrates the process 600 of FIG. 6 described above. As shown, node embeddings of the location entities 701 that are to be evaluated for a specified relation r that is specified in the form of a triple (h, r, t) where h is the head location entity, r is the relation, and the t is the tail location entity. In one embodiment, an intermediate representation 703 of the node embeddings of the location entities 701 and relation r can be learned by applying one or more convolutions 705 to a matrix representation of the node embeddings (e.g., a 3 input matrix corresponding to node embeddings representing h, r, and t).

The convolutions 705 are used to extract or learn feature maps from the node embeddings to generate the intermediate representation 703. The node embeddings can have k-dimensions with each dimension corresponding to a vector element of the vector representation in the embeddings. Accordingly, the matrix representation will be a matrix of k×3. The matrix can be input into a convolutional neural network with convolutional layers corresponding to the selected convolutions 705. The intermediate representation 703 is learned by passing the input matrix through the convolutional layers and concatenating or otherwise aggregating (e.g., via max pooling) the results into the intermediate representation 703.

Additional explicit features 707 (e.g., characterizing the location entities and/or their known spatial/semantic relationships) can be added to the intermediate representation 703. The intermediate representation 703 (with additional explicit features 707) can then be passed through the feed forward layers 709 of the machine learning architecture 700 to compute a prediction 711 indicating whether the relation indicated in the input triple (h, r, t) is plausible for inclusion in the knowledge graph of the corresponding database. In one embodiment, the prediction 711 can output a 0-1 value indicating a probability that the relation is plausible. A threshold value can be applied to the probability to indicate whether the input relation can be classified as plausible or not plausible.

In step 607, provide the relation (e.g., represented by the triple (h, r, t)) as an output. The output, for instance, can be tripe or the relation itself. In addition or alternatively, the relation can be output as a data record that is included in the corresponding knowledge graph or the corresponding database. For example, in the use case of detecting new relationships in a new database 115 created by combining internal data 101 and geographic database 107 (e.g., combined according to the embodiments of entity matching described herein), the output can be new created data records representing the relationship in the new database 115. The output can then be provided to any component of the system 100 (e.g., OEM platform 103, mapping platform 109, services platform 125, services 127, content providers 129, vehicles 133, UEs 135, etc.).

FIGS. 8-14 below provide an example embodiment for creating node embeddings for entity matching and/or relationship prediction according to the embodiments described herein.

Figure 8:
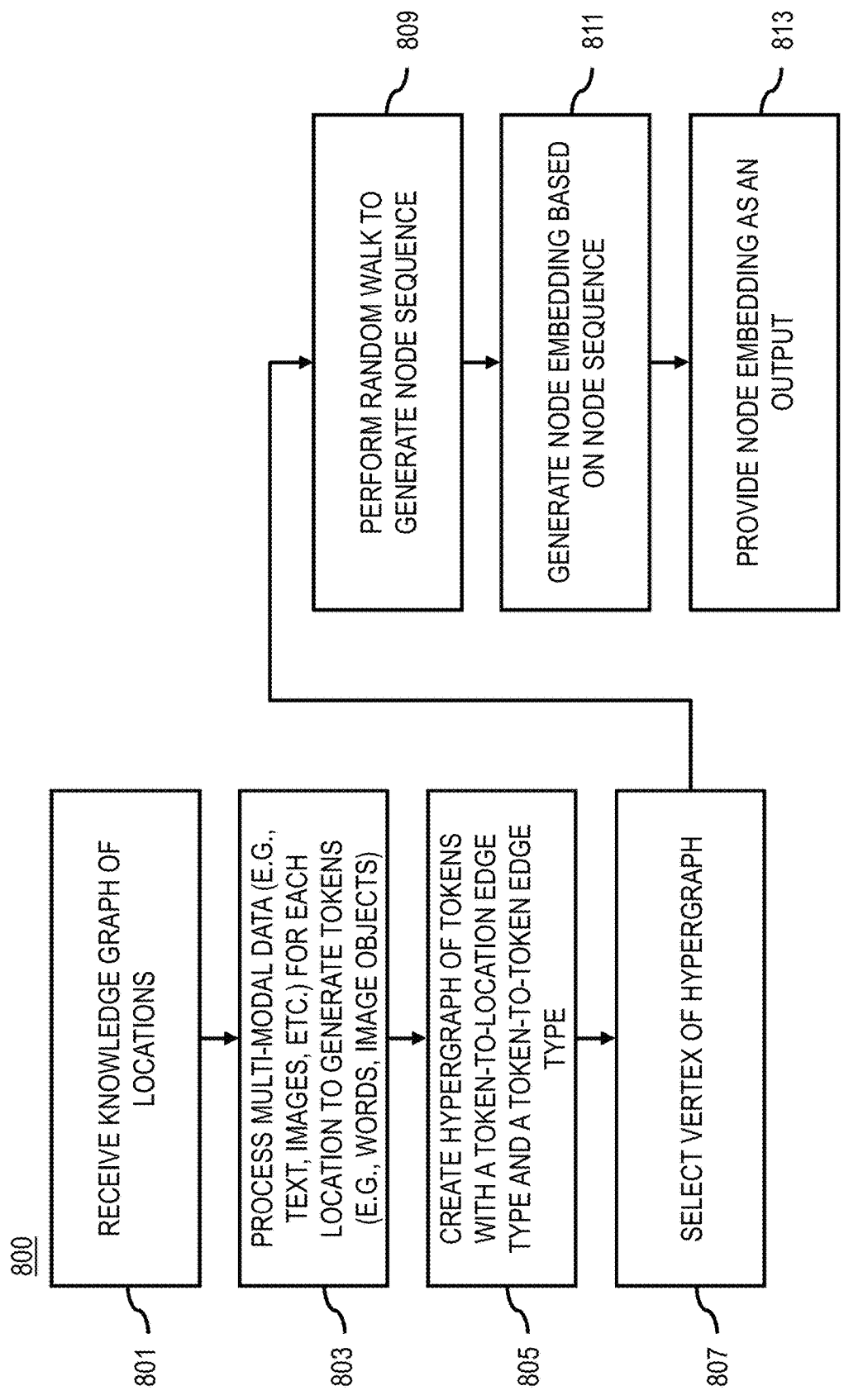
FIG. 8 is a flowchart of a process for providing a semantic-aware or context-aware location representation, according to one embodiment.

FIG. 8 is a flowchart of a process 800 for providing a context-aware and application/service independent location representation for machine learning tasks, according to one embodiment, according to one embodiment. In various embodiments, the machine learning system 119 and/or any of the modules 201-211 may perform one or more portions of the process 800 and may be implemented in, for instance, a chip set including a processor and a memory as shown in FIG. 17. As such, the machine learning system 119 and/or any of the modules 201-211 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In step 801, the graph module 201 receives or otherwise creates a knowledge graph that represents a plurality of location entities as a plurality of location nodes and represents spatial relationship information between the plurality of location nodes as a plurality of location edges. In one embodiment, a knowledge graph (KG) for locations represents real-world entities that, for instance, are stored the geographic database 107 and/or location graph data 105. In various embodiments, a KG and location graph (e.g., the location graph data 105) are used interchangeably.

Figure 9:
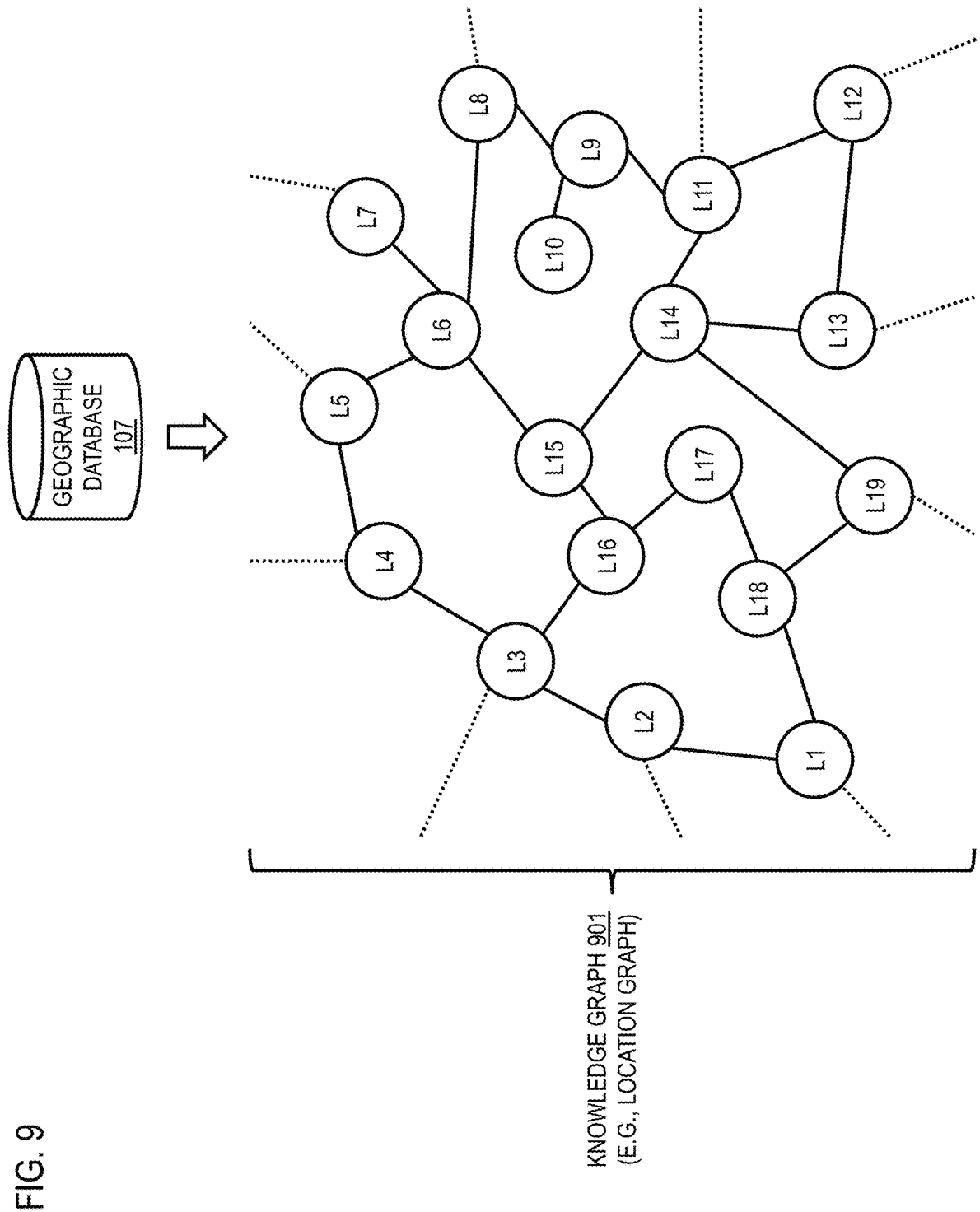
FIG. 9 is a diagram illustrating an example knowledge graph of locations, according to one embodiment.

FIG. 9 is a diagram illustrating an example knowledge graph 901 of locations for generating a semantic-aware location representation, according to one embodiment. Similar to the knowledge graph example of FIG. 4, the digital map data of the geographic database 107 can be processed to generate a knowledge graph 901 of location entities (e.g., POIs, places, terrain features, administrative areas, and/or any other stored cartography/map features at any geographic resolution) of the geographic database 107. The knowledge graph 901, for instance, can represent all of the stored location entities of the geographic database 107 or just a portion of the geographic database 107 (e.g., location graph associated with a country, region, city, etc.). The knowledge graph 901 is a location graph of nodes (e.g., nodes labeled in FIG. 9 as L1-L19 respectively representing 19 different location entities) that are interrelated with relationships. The knowledge graph 901 uses conventions and includes data attributes as described with respect to FIG. 4.

In one embodiment, the data attributes associated with the nodes and/or edges of the knowledge graph 901, may include multi-modal relational location data (e.g., unstructured text data 123, image data 131, etc.). As noted above, integrating this unstructured multi-modal data into the knowledge graph presents a significant technical that is addressed by the various embodiments described herein.

Accordingly, in step 803, the graph module 201 processes multi-modal data (e.g., multi-modal relational location data such as unstructured text data 123) associated with the plurality of location entities of the knowledge graph 901 to determine a plurality of tokens (e.g., words of the text data 123, detected image objects of the image data 131, etc.). In other words, most of the location entities of the knowledge graph 901 have associated unstructured text (e.g., from Wikipedia articles, Common Crawl web sites, etc. and/or provided by the service platform 111, services 127, and/or content providers 129).

For example in the use case of unstructured text, incorporating this unstructured text into the KG using data mining and KG construction techniques is resource intensive to point of being infeasible under traditional technologies because of the scale or volumes of available text data 123 or other multi-modal relational location data. In addition to issues of scale, KGs typically are highly structured by definition. Therefore, adding poorly defined data (e.g., unstructured text data 123 or equivalent) would weaken the usefulness of the knowledge graph 901 by inducing noise and spurious connections. However, there are still valuable insights that can be drawn from unstructured text data 123 or any other multi-modal relational location data (e.g., image data 131) about a location entity. For example, if two restaurants (e.g., examples of POI entities) have their menus online, the text in those menus may share many words and phrases even if their coarse categories are not the same. Leveraging this text would allow the system 100 or any corresponding service or application to know that the two are conceptually connected even if the KG does not link them in that way.

Therefore, as part of step 803, the graph module 201 can gather text features (e.g., text data 123) and/or other multi-modal relational location data (e.g., image data 131) for individual nodes of the knowledge graph 901. By way of example, gathering can include but is not limited to querying the services platform 125, services 127, and/or content providers 129 for content associated with a location node or entity of interest. In another example, a web crawler or other automated data gathering means can be used to extract information from online web data sources to determine text data 123 and/or other multi-modal relational location information about location entities of interest.

The graph module 201 can then, for instance, process the gathered data to extract tokens (e.g., words, image objects, etc.) from the multi-modal relational location data. For example, for gathered text data 123, the graph module 201 can preprocess the text data 123 using a natural language processing (NLP) pipeline or means to extract the tokens as a set of words comprising the text data 123. In one embodiment, the graph module 201 can just extract the tokens identified by the NLP processing pipeline as nouns or other designated parts of speech. In this example, by selecting only the nouns, the graph module 201 can advantageously focus on salient text by removing tokens or words that may be inappropriate tokens (e.g., words related to script tags from web pages).

Figure 10:
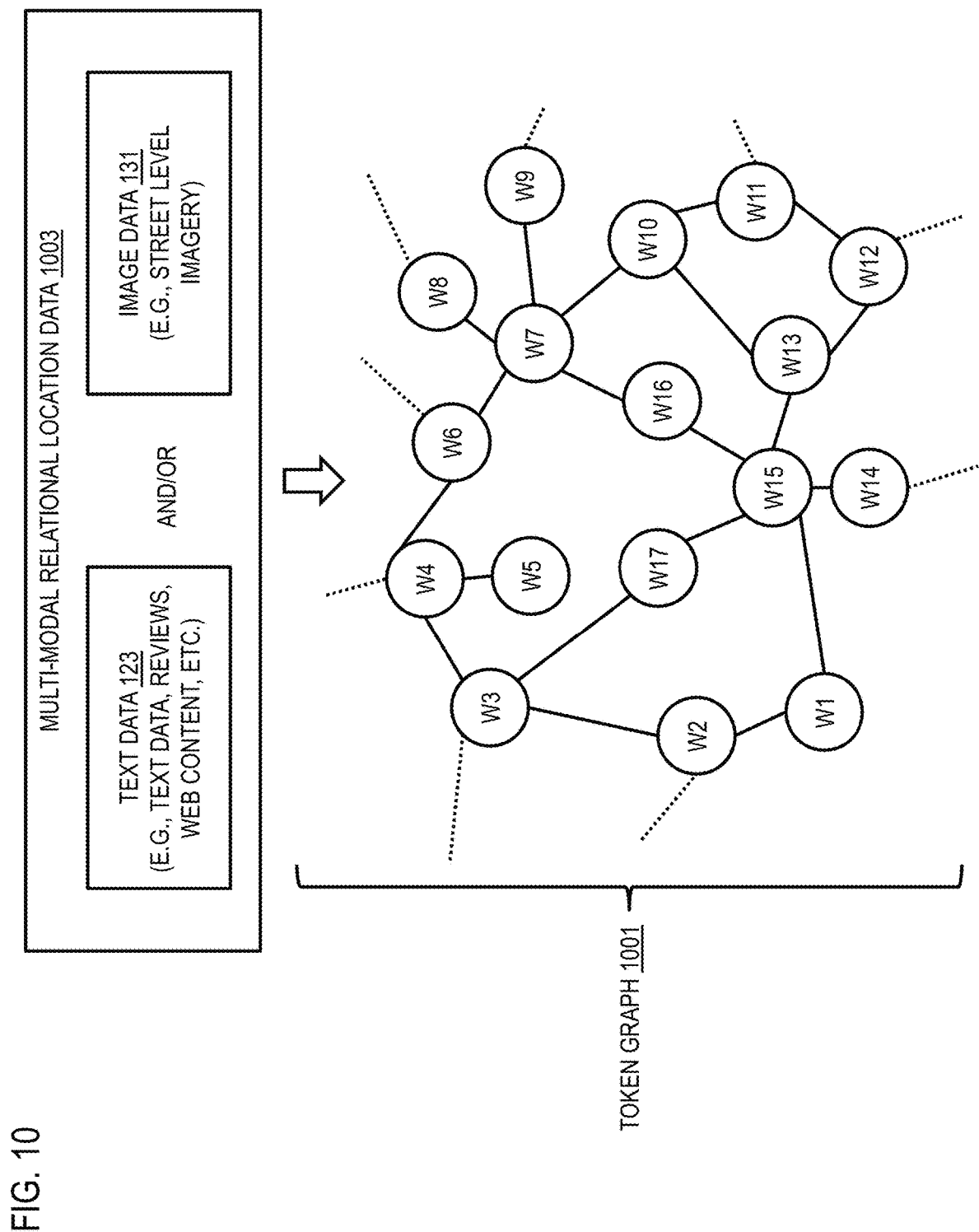
FIG. 10 is a diagram illustrating an example of a token graph created from multi-modal data, according to one embodiment.

FIG. 10 is a diagram illustrating an example of a token graph 1001 created from multi-modal data 1003, according to one embodiment. In the example of FIG. 10, multi-modal relational location data 1003 comprising text data 123, image data 131, and/or the like are gathered for a given location entity of interest. In this example, the primary data type is unstructured text data 123 gathered from web pages related to the location entity (e.g., a web page for the location itself, web text related to reviews or articles about the location, etc.). A NLP pipeline is used to process the gathered text data 123 to extract all of the noun words from the text to create the token graph 1001 a plurality of token nodes (e.g., labeled in the token graph 1001 as W1-W17 to represent an example set of 17 words/tokens). Thus, in the example above, the multi-modal data 1003 is unstructured text data 123 such that the plurality of tokens that is extracted is a plurality of words of in the unstructured text data 123.

In one embodiment, the edges between the token nodes of the token graph 1001 can represent the determined similarity between the two words. For example, the similarity between any two tokens can be computed using the respective token embeddings of the NLP pipeline used to extract the tokens. In some embodiments, to reduce the processing resource load, the token similarity can be computed for just a designated subset of the entire vocabulary or set of tokens/words in the token graph 1001. For example, the graph module 201 can select N random pairs of token nodes and compute the similarity scores (e.g., normalized to a value between 0—not similar—and 1—the same or most similar word) just for those N random pairs.

In the case of other types of multi-modal relational location data 1003 such as, but not limited to, image data 131, similar processing pipelines can be applied. For example, image data 131 (e.g., street level imagery) can be processed using any object recognition/detection pipeline or process to detect image objects depicted in the image data. These image objects can be represented as respective tokens in the token graph 1001. The relative locations of the image objects can also be detected as well as the similarity of the objects can be computed (e.g., via the same object recognition/detection pipeline) to characterize the relationships or edges between the image objects in the token graph 1001.

It is noted that the creation of the token graph 1001 is provided by way of illustration and not as a limitation. It is noted that in some embodiments, the graph module can incorporate the creation of the token graph 1001 as integral part of creating a "hypergraph" (e.g., distributed graph representation) to enrich the knowledge graph 901 as described in the embodiments below. As used herein, the term "hypergraph" refers to a graph enrichment that adds nodes and links to the knowledge graph to represent the words/tokens of the unstructured information and the relationships between the words/tokens. The graph enrichment or hypergraph can be a temporary graph structure that is created for the purpose of generating node embeddings or can be stored for use by other applications or services relying on such hypergraphs.

In one embodiment, the machine learning system 119 can learn some representation (e.g., a semantic-aware location representation) of each location entity in the knowledge graph 901 such that both the knowledge graph 901's structure and the location entity's external signal (e.g., text or other modalities represented in the token graph 1001) are incorporated. Accordingly, in step 805, the graph module 201 creates a hypergraph that represents the plurality of tokens (e.g., extracted from the gathered multi-modal data 1003) as a plurality of token nodes (e.g., as described with respect to the token graph 1001). The hypergraph includes: (1) a first edge type that relates a token node of the plurality of token nodes to a location node of the plurality of location nodes of the knowledge graph 901, and (2) a second edge type that relates a first token node to a second token node of the plurality of token nodes.

In other words, the graph module 201 creates the semantic-aware location representations (e.g., node embedding data) using a hypergraph: e.g., a temporary, auxiliary graph that connects nodes of the knowledge graph 901 for the purpose of creating node embeddings. This hypergraph contains nodes representing text or other types of tokens (e.g., "affordable", "scenic") and two types of edges: those linking location nodes of the knowledge graph 901 to token nodes, and those linking token nodes together. In one embodiment, the different edge types can also be weighted based on the nodes being connected. For example, for the edge type that connects a token node to a location node, the graph module 201 can weight this edge type based on token frequency data. The token frequency data indicates the frequency that the token appears in the multi-modal data 1003 (e.g., text data 123, image data 131, etc.) associated with the location entity to which it is connected. It is contemplated that any metric indicating such token frequency data can be used including, but not limited, to term frequency-inverse document frequency (TF-IDF) value (e.g., normalized to 0-1) or equivalent. The TF-IDF value, for instance, increases proportionally to the number of times the token appears in the multi-modal data 1003 gathered for a location entity and is offset by the number of documents in the gathered multi-modal data 1003. In one embodiment, the graph module 201 can select the plurality of tokens to include in the hypergraph based on the token frequency data. For example, the graph module 201 can include those tokens (e.g., noun tokens) that have a TF-IDF value above a threshold value.

For the second edge type between a first token and a second token, the graph module 201 can weight the edge based on a token similarity between the two connected tokens. For example, this edge type can be weighed by the cosine similarity score of those tokens' pretrained embeddings. As discussed above, the graph module 201 can reduce the time and/or computing resources for computing token similarity scores by selecting a subset of the tokens for computing a similarity score. In this way, the token similarity value (e.g. normalized to 0-1) can be computed for a predefined number (N) random pairs of the plurality of tokens identified in the gathered multi-modal data for a given location entity.

Figure 11A:
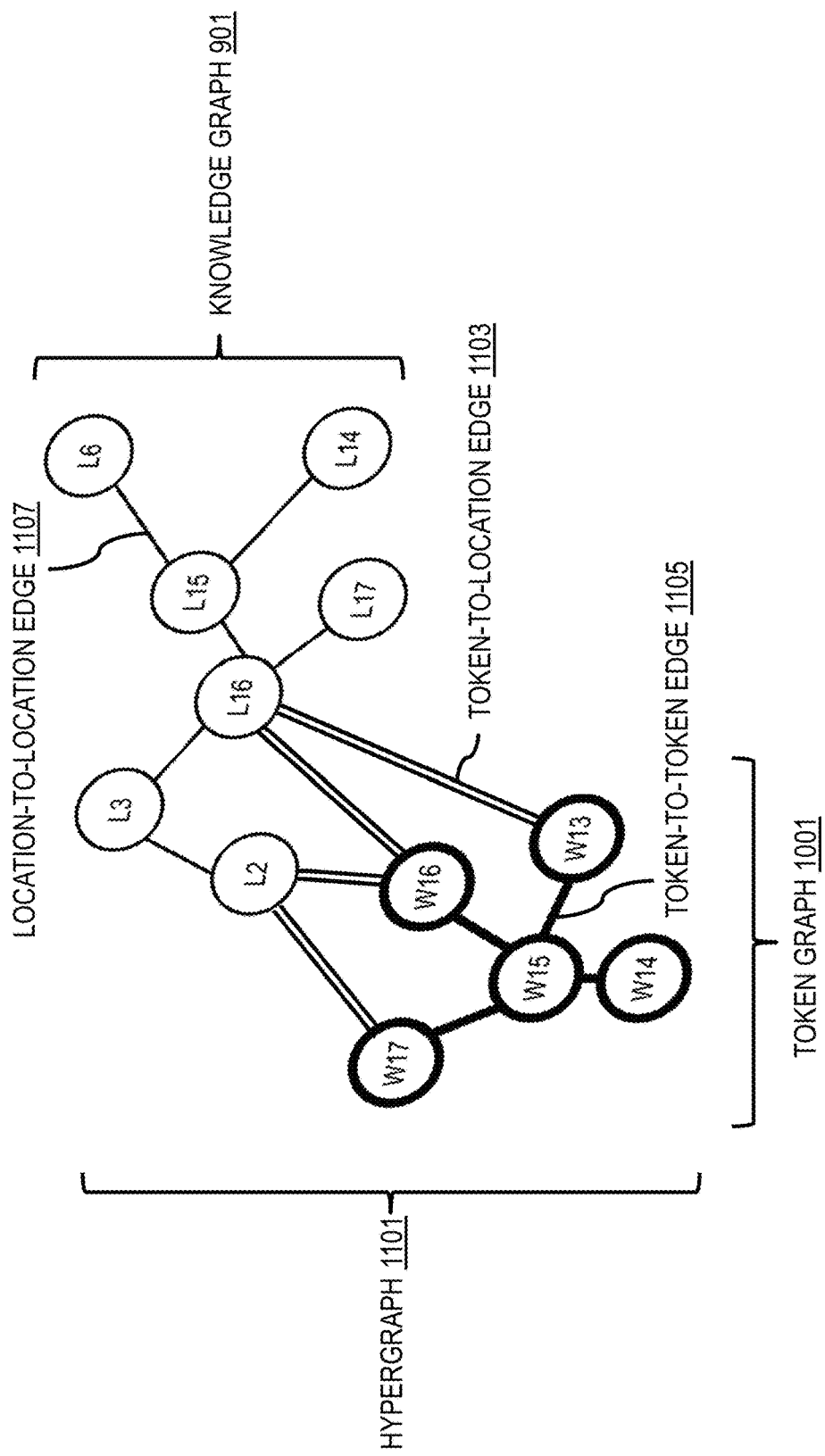
FIGS. 11A and 11B are diagrams illustrating an example hypergraph of distributed representations of an enriched knowledge graph and an example random walk through the hypergraph, according to one embodiment.

FIG. 11A illustrates an example hypergraph 1101, according to one embodiment. As shown, the hypergraph 1101 links one or more the locations nodes of the knowledge graph 901 (only a portion of the knowledge graph 901 is depicted for simplicity) and/or or more token nodes of the token graph 1001 (only a portion of the token graph 1001 is depicted for simplicity). In this way, the hypergraph 1101 integrates the spatial or structural information of the knowledge graph 901 with the multi-modal relational location data 1003 (e.g., unstructured text data, image data, etc.) of the token graph 1001 as a distributed but connected hypergraph. The hypergraph 1101 includes a set of tokens W13-W17. Each of the tokens W13-W17 represents a respective word extracted from unstructured text data associated with one or more locations.

The hypergraph 1101 then links the tokens W13-W17 to one or more locations of the knowledge graph 901 represented by a set of location nodes {L2, L3, L6, L14-L17} via one or more token-to-location edges 1103 (e.g., a first edge type of the hypergraph 1101). The token-to-location edge 1103 indicates that a token appears in the one or more documents or other data sources gathered for the corresponding location. In one embodiment, the token-to-location edge can be weighted based on the frequency of the token appearing in the documents offset by the number of documents (e.g., a TF-IDF value or equivalent). For example, if a token or word appears frequently in the gather multi-modal data 1003 of a location node or entity, then the token TF-IDF value or other frequency value will be higher.

Similarly, the token-to-token edges 1105 between a first token and a second token in the hypergraph 1101 can also be weighted. In this case, the weighting can be based on a similarity value between the two connected tokens (e.g., as computed by a trained NLP pipeline or process using pretrained token embeddings). More specifically, in one embodiment, the weighting can be computed as a cosine similarity between the respective pretrained token embeddings of the two tokens.

In the illustrated example of FIG. 11A, the location-to-location edges 1107 connecting any two location entities of the knowledge graph 901 can also be weighted. The weighting can be based on spatial proximity (e.g., 0-1 representing a spatial distance) and/or semantic proximity (e.g., 0-1 representing distance between the semantic features of the location entities).

In summary, the graph module 201 constructs a hypergraph 1101 that enriches the knowledge graph 901 with the multi-modal relational location data 1003 for each location entity. To do this, in one embodiment, the hypergraph 1101 provides both token-to-location edges and token-to-token edges to define a distributed enriched knowledge graph. Accordingly, each vertex or node of the hypergraph 1101 can be either a token node or location node.

After creating the hypergraph 1101, in step 807, the graph module selects a vertex of the hypergraph 1101 that corresponds to a node of either the plurality of token nodes or the plurality of location nodes. In one embodiment, the selected vertex can be associated with a location entity of interest for which node embedding data is be generated or a token node associated with the location entity. In step 809, the graph module 201 performs one or more random walks of the hypergraph based on the selected vertex to generate a node sequence comprising a subset of one or more nodes and one or more edges of the hypergraph. In other words, the graph module 201 runs one or more random walks to generate an artificial corpus of node sequences related to a selected node or vertex of the hypergraph.

In one embodiment, the random walk is biased based on the one or more edge weight values of the one or more edges of the hypergraph traversed during the random walk. For example, the edge weights can be used to adjust the probability of the random walk traversing one of the possible paths at each vertex such that edges with higher weights have a higher probability begin chosen on the random walk than edges with lower weights.

Figure 11B:
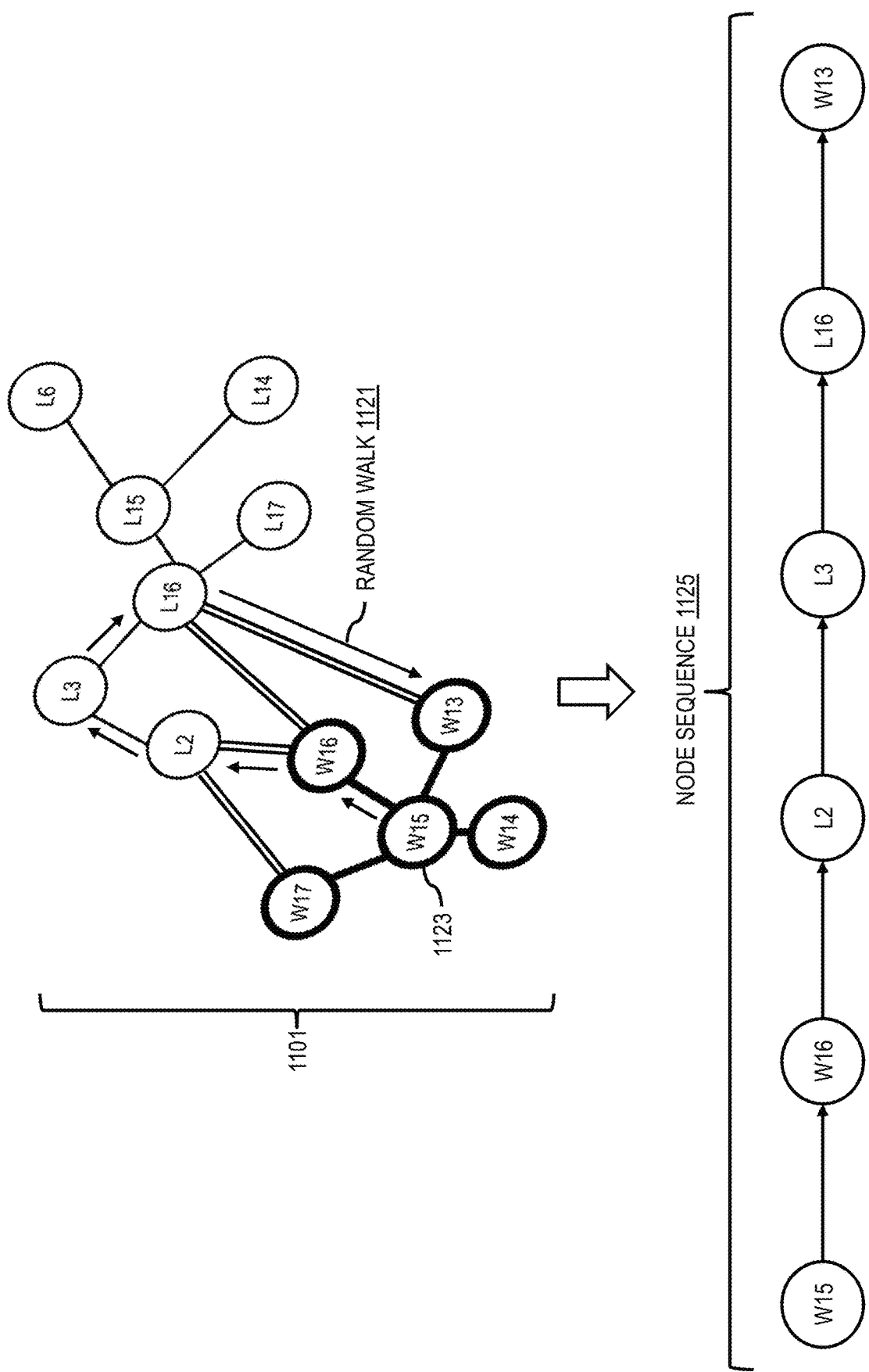

FIG. 11B illustrates a random walk 1121 through a hypergraph 1101, according to one embodiment. In the example of FIG. 11B, a vertex 1123 (e.g., token node W15) is selected as the starting point of the random walk 1121 (e.g., indicated by a sequence of arrow between nodes of the hypergraph). Beginning at selected vertex 1123, the random walk 1121 randomly selects the next node to "walk" to. In one embodiment, the selecting can be purely random. For example, the next node from vertex 1123 can be one of our options (e.g., W13, W14, W16, or W17). In a purely random approach, there is equal probability that any of the nodes W13, W14, W16, or W17 can be next node. Alternatively, the probability of each node being next can be biased according to the respective edge weight values connecting each node to the vertex 1123 (or preceding node in the random walk 1121). For example, if the edge weight between the vertex 1123 and node W14 is less than the edge weight between the vertex 1123 and node W16, then node W16 will have a higher probability of being randomly chosen as the next node in the random walk 1121. In this case, node W16 is selected as the next node in the walk.

In one embodiment, the random walk 1121 continues until a fixed or predefined number of nodes is traversed. At each subsequent node, each different edge type (e.g., token-to-location edge, token-to-token edge, and/or location-to-location edge) provides a different possibility for continuing the random walk 1121. In this way, the random walk 1121 can go in between any of the node types or vertices of the hypergraph (e.g., token-to-token, token-to-location, location-to-location, or location-to-token). After the random walk 1121 reaches the predetermined number of nodes to traverse (e.g., or meets any other ending criteria such as, but not limited to, doubling back, reaching an end node, etc.), a node sequence 1125 of the nodes traversed during the random walk can be provide as an output (e.g., sequence including token node W15, token node W16, location node L2, location node L3, location node 16, and token node W13).

In one embodiment, the graph module 201 can add the output to an artificial corpus of data from which corresponding node embedding data can be generated. The graph module 201 can define a predetermined number of random walks to perform based on an amount of data to achieve a target quality level for the resulting embedding or based on the number of possible random walks that can started from the selected vertex and the predefined number of nodes to traverse in one random walk.

In step 811, the embedding module 205 generates a node embedding to represent the node corresponding to the selected vertex (e.g., the selected location or token node) based on the one or more node sequences generated by the one or more random walks (e.g., the artificially generated corpus of data).

In one embodiment, the node embedding is generated based on a skip-gram machine learning approach or equivalent. Under this approach, the embedding module 205 can begin by generating a sparse feature representation of the node sequence(s) generated by the random walk(s).

FIG. 12 is a diagram illustrating an example of encoding a sparse feature vector 1201 based a node sequence 1125 generated from a random walk 1121 of hypergraph 1101 (as illustrated in the example of FIG. 11B), according to one embodiment. In this example, the node sequence 1125 (e.g., as generated by the random walk 1121) includes six nodes of hypergraph 1101: token node 1203a (W15), token node 1203b (W16), location node 1205a (L2), location node 1205b (L3), location node 1205c (L16), and token node 1203c (W13). The embedding module 205 can then determine label encodings (e.g., binary-encoded labels using one-hot encoding or other encoding scheme) of the attributes or categories respective nodes (e.g., stored in the knowledge graph 901, token graph 1001, and/or multi-modal relational location data 1003). For example, the labels can indicate what the token is (e.g., token="menu") and/or the place categories associated with a location entity (e.g., place category="Eat and drink", "Going out entertainment", etc.). The embedding module 205 can process the encoded labels of the node sequence 1125 to create a sparse feature vector 1201 for the node sequence 1125 (e.g., vec ("node sequence 1125")) by concatenating the encoded labels of each node in the node sequence 1125. The feature vector 1201 is sparse because the one-hot encoding results in vector containing a value of 0 for the vast majority of the vector elements.

After extracting a feature vector from the node sequence 1125 of the random walk 1121, the embedding module 205 initiates a processing of the multi-modal relational location data of the node sequence 1125 (e.g., represented as the extracted feature vector 1201) using a machine learning model 121 selected for creating the node embedding data. In one example embodiment, the machine learning model 121 is a skip-gram type model that is trained (e.g., by the learning module 203) to predict a location based on one or more associated location inputs. A skip-gram model, for instance, takes the feature vector of a location's context (e.g., neighbors) or other related attributes and predicts the location. In one use case, the skip-gram model can accept encodings of the spatial relationships of locations or map tile encodings of specific locations' neighbors to predict a specific location on a map tile or other designated geographic area. In short, in an embodiment under this approach, the input is a location's context, and the output is the location of interest (e.g., the machine learning model is trained to predict a location based on one or more other locations neighboring or otherwise associated with the location). Therefore, encoding of the input (e.g., a location's context) by the machine learning model performing this type of task can provide a vector representation (e.g., location or node embedding) of the location.

In another example embodiment, the machine learning model is trained to perform a general task based on the input (e.g., trained by the learning module 203). This general task can be any task that uses the feature vector of the node sequence 1125 as an input to generate the model's output. For example, the general task can include but is not limited to a location categorization task, a search task, etc.

It is noted that the types of machine learning models described above are provided by way of illustration and not as limitations. It is contemplated that any type of model or training can be applied to the machine learning model for generating the node embedding output. It is noted that the type or extent of training of the machine learning is also not a factor in selecting the machine learning model to use. Instead, in one example embodiment, one selection factor is whether the machine learning operates on the multi-modal relational location data of the node sequence 1125 in the feature vector 1201 in a way that generates an intermediate representation of the corresponding node of the hypergraph within its hidden layers.

Figure 13:
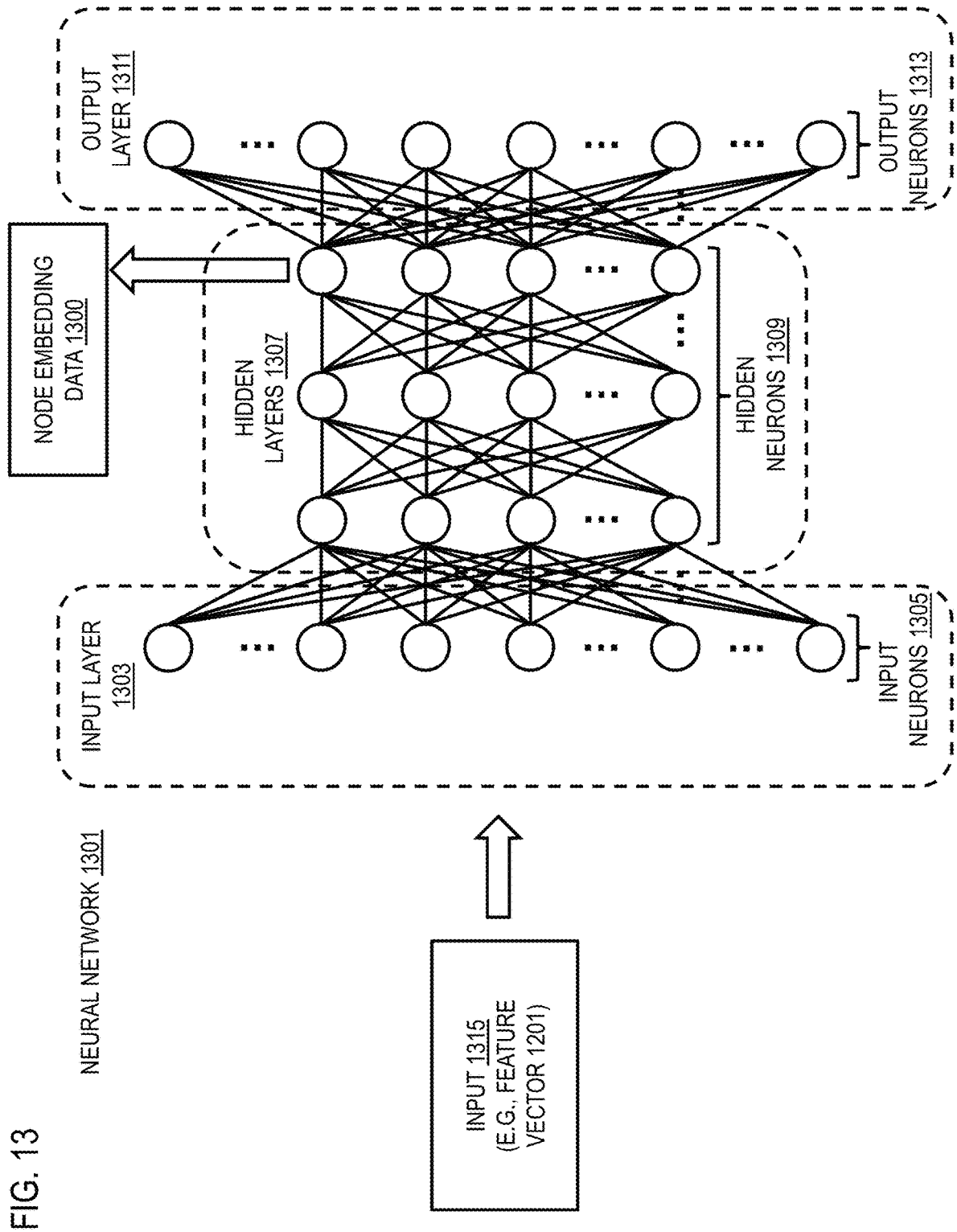
FIG. 13 is a diagram illustrating an example machine learning model from which node embedding for machine learning tasks can be extracted, according to one embodiment.

FIG. 13 is a diagram illustrating an example machine learning model 1301 from which node embedding (e.g., node embedding data 1300) for machine learning tasks can be extracted, according to one embodiment. As shown, the example machine learning model is a neural network 1301 that includes an input layer 1303 containing input neurons 1305, a hidden layer 1307 containing hidden neurons 1309, and an output layer 1311 containing output neurons 1313. In this example, the input neurons 1305 respectively correspond to one or more input features of input 1315 (e.g., the feature vector 1201 representing the node sequence 1125 of the random walk 1121). In the location data domain, the number of features can be quite large (e.g., thousands or tens of thousands of features and corresponding input neurons 1305). The hidden layer 1307 can contain any number of layers of hidden neurons 1309 depending on the selected architecture or application of the network 1301. The output layer 1311 contains output neurons 1313 corresponding to each possible output category. Again, in the location data domain, the potential number categories can significant.

The embedding module 205 feeds the extracted feature vector 1201 of input 1315 into the input layer 1303. In this example, the neural network 1301 is trained meaning that the weights and coefficients of the neurons and connection between the neurons of the different layers 1303, 1307, and 1311 have been adjusted to make accurate predictions. The neural network 1301 can be a feed forward network that propagates messages from in the input layer 1303 through subsequent adjacent layers of the hidden layers 1307 and to the output layer. Message propagation through the neural network 1301 is determined by respective aggregation and propagation functions at each neuron. So, by providing the input feature vector to the input layer 1303, the embedding module 205 causes a cascade of neuronal value updates throughout the network 1301 from the input layer 1303 towards the output layer 1311.

The embedding module 205 can then extract a vector representation of the node sequence 1125 (e.g., the node embedding). Extracting, for instance, refers to reading the aggregation function values at each neuron of a selected hidden layer. As shown, the neural network 1301 includes three hidden layers 1307. In one embodiment, the vector representation of the location can be extracted from the penultimate layer (e.g., the hidden layer immediately preceding the output layer 1311). This is because, as messages propagate feed forward through the neural network 1301, the encoding of the various attributes of the neurons can be more dense or be associated with more predictive features. It is noted that the features or attributes correspond to respective features, but in many cases the features have been abstracted through the neural network 1301 so that the features are not likely to be human understandable (e.g., although they do reflect the position of the location within an N-dimensional feature space of the neural network 1301). It is noted, however, although one example embodiment extracts from the penultimate layer, it is contemplated the vector representation to use as a location embedding can be extracted from any of the hidden layers.

By way of example, the vector representation or node embedding is a fixed-length, real-valued vector that encodes one or more attributes of the location. As noted above, the attributes correspond to respective neurons of the hidden layer. Accordingly, in one embodiment, the fixed-length of the vector representation is based on the number of neurons in the hidden layer from which the vector is extracted. For example, if there are 300 neurons in the hidden layer, then the vector will be 300 elements in length with each element corresponding to the aggregation function value of a respective neuron.

Figure 14:
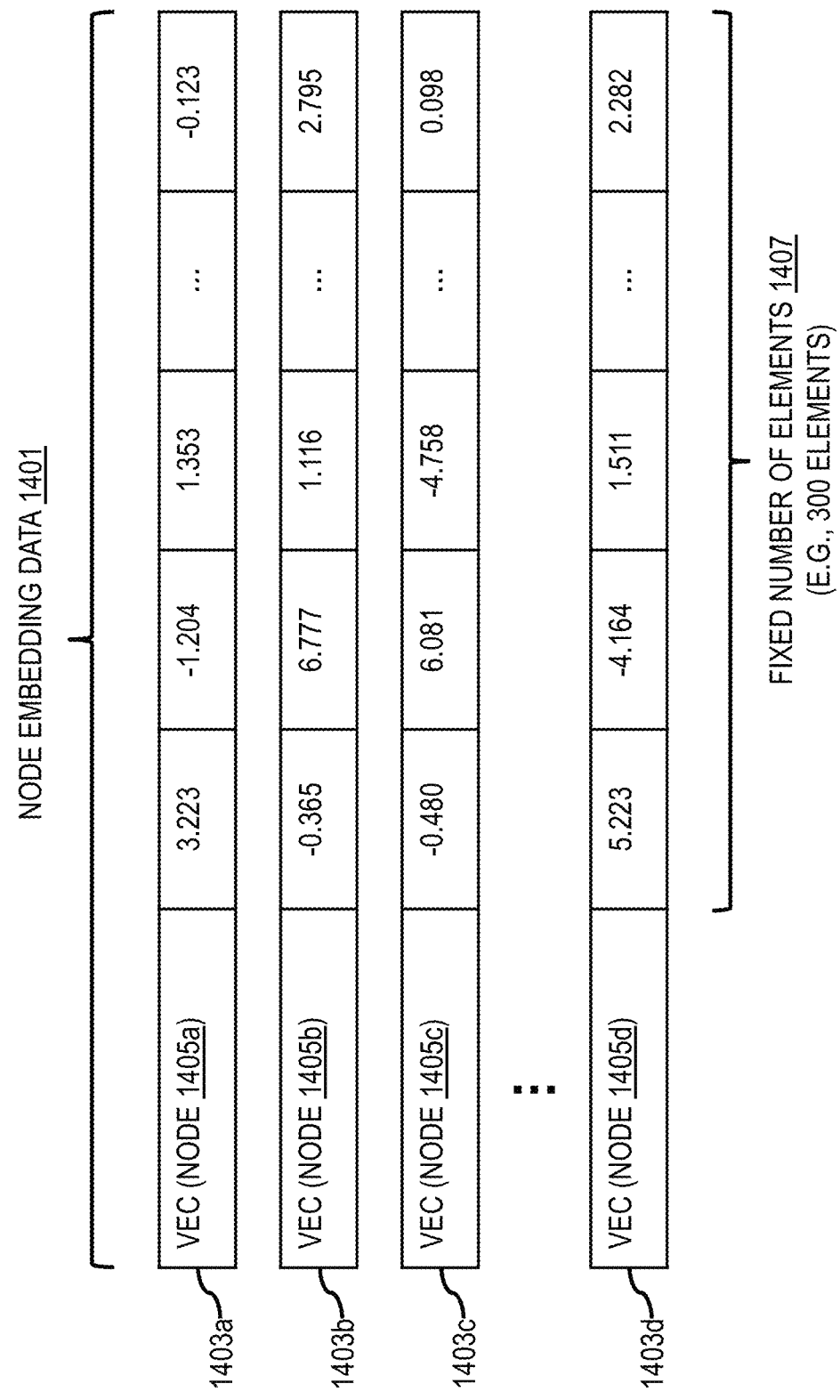
FIG. 14 is a diagram illustrating example node embedding data, according to one embodiment.

In step 813, the output module 211 provides the node embedding as an output (e.g., for entity matching and/or relationship prediction according to the embodiments described herein). FIG. 14 is a diagram illustrating example location embedding data 1401, according to one embodiment. As shown, location embedding data 1401 includes vectors 1403a-1403d (also collectively referred to as vectors 1403) that respectively represent nodes or node sequences 1405a-1405d (also collectively referred to nodes 1405). In this example, the vectors 1403 are labeled to identify the respective nodes 1405, followed by a one-dimensional array of attribute elements values extracted from the hidden layer of the embedding machine learning model at a fixed number of elements 1407 (e.g., 300 elements). Conceptually, the vector defines the position of the corresponding node of interest within a feature space with a number of dimensions equal to the number elements of the vectors 1403 (e.g., 300 elements=a 300 dimension feature space). The distance between each vector in the feature space represents the computed similarity of closeness of locations within the feature space, based on the underlying structure extracted from the multi-modal relational location data 1003. Because the underlying structure can include both spatial and semantic relationships, the feature space also can represent both the physical and the semantic relationships of different locations. For example, Washington, D.C., and Paris may be similar semantically because they are both capital cities but are physically distant. This latent structural information (among others that may not be human interpretable) can be encoded in the location embeddings In summary, one example embodiment of the process 800 can be presented as follows for a text data 123 use case:
1. Gather all text features for each node in a constructed hypergraph 1101 that enriches a knowledge graph 901 with multi-modal relational location data 1003 (e.g., unstructured text data, images, etc.).
2. Preprocess the text; e.g., the system 100 reads each source of text or other data using techniques such as, but not limited to, an NLP pipeline (e.g., SpaCY) and retain noun phrases. This allows one embodiment of the process 800 to focus primarily on salient text, and has the additional impact of removing inappropriate tokens (e.g., script tags from web pages).
3. Calculate TF-IDF values for each token in the processed text for each KG node.
4. Add each text token (e.g., that satisfies a minimum TF-IDF threshold) to the hypergraph 1101 such that it is connected to all entities whose text features have that token present.
5. Each edge connecting a knowledge graph node with a text node is weighted by the corresponding TF-IDF value (0-1).
6. Compute cosine similarity (or equivalent similarity value) between pretrained token embeddings (e.g., using the same NLP pipeline used above) for N random pairs of token nodes. In one embodiment, N nodes are selected, rather than the entire Vocabulary×Vocabulary number of edges, as a practical implementation choice to reduce time and resource consumption for computing similarity.
7. Each of the N edges connecting a text node with another is weighted by the corresponding cosine similarity values (0-1) or equivalent.

8. Run biased random walks (to account for edge weights) to generate an artificial corpus of data as described above.
9. Generate node embeddings using the skip-gram model or equivalent.
10. Use the node embedding data for downstream machine learning tasks (e.g., entity-matching for combining different data sources and/or relationship prediction according to the embodiments described herein).

In one embodiment, as indicated above, the output module 211 can provide the location embedding output as an input to one or more downstream machine learning tasks. In this way, the downstream machine learning tasks can benefit from the already encoded node embedding data. The node embedding output can be provided in any data structure or format. For example, the vectors can be presented as list in a text file that can be ingested by the downstream machine learning tasks.

Returning to FIG. 1, as shown, the system 100 includes a machine learning system 119 for providing a generalizable semantic-aware location representation for machine learning tasks such as entity matching for combining data sources and/or relationship prediction according to the various embodiments described herein. In one embodiment, the machine learning system 119 includes or is otherwise associated with one or more machine learning models 121 (e.g., neural networks or other equivalent network) for generating node embeddings. The machine learning models 121 can also be used as part of a computer vision system for detecting new or updated places through image analysis.

In one embodiment, the machine learning system 119 has connectivity over the communication network 113 to the mapping platform 109, services platform 125 that provides one or more services 127 that can use node embedding data for downstream machine learning tasks (e.g., entity-matching for combining data sources and/or relationship prediction according to the embodiments described herein) to perform one or more functions. By way of example, the services 127 may be third party services and include but is not limited to mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 127 uses the output of the machine learning system 119 (e.g., location embeddings) to provide services 127 such as navigation, mapping, other location-based services, etc. to the vehicles 133, UEs 135, and/or applications 137 executing on the UEs 135.

In one embodiment, the machine learning system 119 may be a platform with multiple interconnected components. The machine learning system 119 may include multiple servers, intelligent networking devices, computing devices, components, and corresponding software for combining location data sources according to the various embodiments described herein. In addition, it is noted that the machine learning system 119 may be a separate entity of the system 100, a part of the mapping platform 109, one or more services 127, a part of the services platform 125, or included within components of the vehicles 133 and/or UEs 135.

In one embodiment, content providers 129 may provide content or data (e.g., including geographic data, etc.) to the geographic database 107, machine learning system 119, the mapping platform 109, the services platform 125, the services 127, the vehicles 133, the UEs 135, and/or the applications 137 executing on the UEs 135. The content provided may be any type of content, such as machine learning models, map embeddings, map content, textual content, audio content, video content, image content, etc. In one embodiment, the content providers 129 may provide content that may aid in combining location data sources according to the various embodiments described herein. In one embodiment, the content providers 129 may also store content associated with the machine learning system 119, internal data 101, geographic database 107, OEM platform 103, mapping platform 109, services platform 125, services 127, and/or any other component of the system 100. In another embodiment, the content providers 129 may manage access to a central repository of data, and offer a consistent, standard interface to data, such as a repository of the geographic database 107.

In one embodiment, the vehicles 133 and/or UEs 135 may execute software applications 137 to detect map features/objects for node embedding according the embodiments described herein. By way of example, the applications 137 may also be any type of application that is executable on the vehicles 133 and/or UEs 135, such as autonomous driving applications, mapping applications, location-based service applications, navigation applications, device control applications, content provisioning services, camera/imaging application, media player applications, social networking applications, calendar applications, and the like. In one embodiment, the applications 137 may act as a client for the mapping platform 109 and perform one or more functions associated with providing node embeddings alone or in combination with the mapping platform 109.

By way of example, the vehicles 133 and/or UEs 135 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 133 and/or UEs 135 can support any type of interface to the user (such as "wearable" circuitry, etc.). In one embodiment, the vehicles 133 and/or UEs 135 may be associated with or be a component of a vehicle or any other device.

In one embodiment, the vehicles 133 and/or UEs 135 are configured with various sensors for generating or collecting environmental image data (e.g., multi-modal relational location data for processing by machine learning system 119), related geographic data, etc. In one embodiment, the sensed data represent sensor data associated with a geographic location or coordinates at which the sensor data was collected, and the polyline or polygonal representations of detected objects of interest derived therefrom. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 133 and/or UEs 135 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicles 133 and/or UEs 135 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicles 133 and/or UEs 135 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 119, OEM platform 103, mapping platform 109, services platform 125, services 127, vehicles 133 and/or UEs 135, and/or content providers 129 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
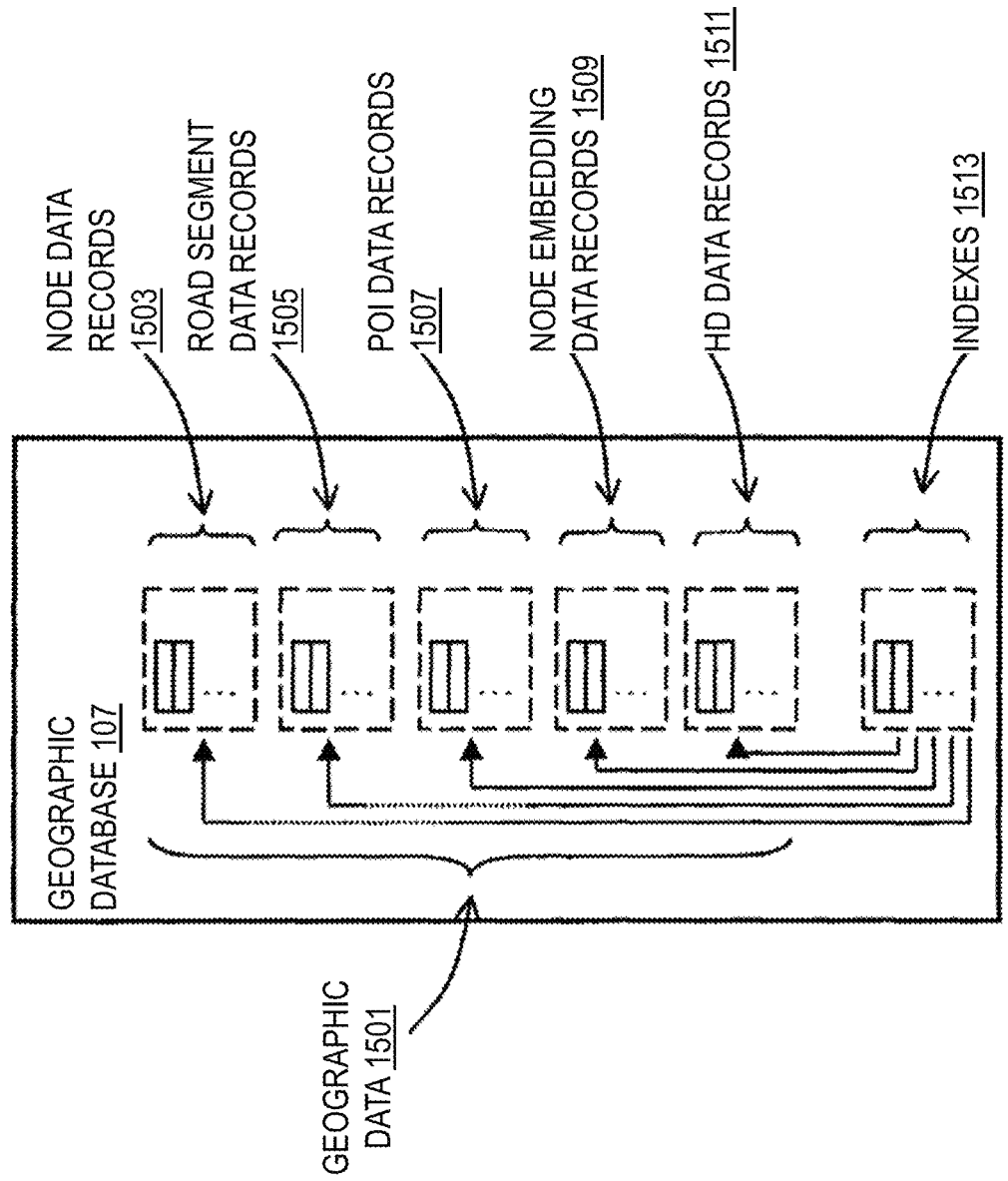
FIG. 15 is a diagram of a geographic database, according to one embodiment.

FIG. 15 is a diagram of a geographic database 107, according to one embodiment. In one embodiment, the geographic database 107 includes geographic data 1501 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1501. In one embodiment, the geographic database 107 include high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data (e.g., HD data records 1511) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 1503, road segment or link data records 1505, POI data records 1507, node embedding data records 1509, HD mapping data records 1511, and indexes 1513, for example. More, fewer, or different data records can be provided. In one embodiment, additional data records (not shown) can include cartographic ("cartel") data records, routing data, and maneuver data. In one embodiment, the indexes 1513 may improve the speed of data retrieval operations in the geographic database 107. In one embodiment, the indexes 1513 may be used to quickly locate data without having to search every row in the geographic database 107 every time it is accessed. For example, in one embodiment, the indexes 1513 can be a spatial index of the polygon points associated with stored feature polygons.

In exemplary embodiments, the road segment data records 1505 are links or segments representing roads, streets, or paths, as can be used in the calculated route or recorded route information for determination of one or more personalized routes. The node data records 1503 are end points (for example, representing intersections or an end of a road) corresponding to the respective links or segments of the road segment data records 1505. The road link data records 1505 and the node data records 1503 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 1507. The geographic database 107 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In one embodiment, the geographic database 107 can also include node embedding data records 1509 for node embeddings, location graphs, machine learning model parameters, and/or any other related data that is used or generated according to the embodiments described herein. By way of example, the node embedding data records 1509 can be associated with one or more of the node records 1503, road segment records 1505, and/or POI data records 1507 to associate the semantic category predictions with specific places, POIs, geographic areas, and/or other map features. In this way, the semantic category data records 1509 can also be associated with the characteristics or metadata of the corresponding records 1503, 1505, and/or 1507.

In one embodiment, as discussed above, the HD mapping data records 1511 model road surfaces and other map features to centimeter-level or better accuracy. The HD mapping data records 1511 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1511 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1511 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1511.

In one embodiment, the HD mapping data records 1511 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 107 can be maintained by the content provider 129 in association with the services platform 125 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicles 133 and/or UEs 135. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for combining location data sources may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
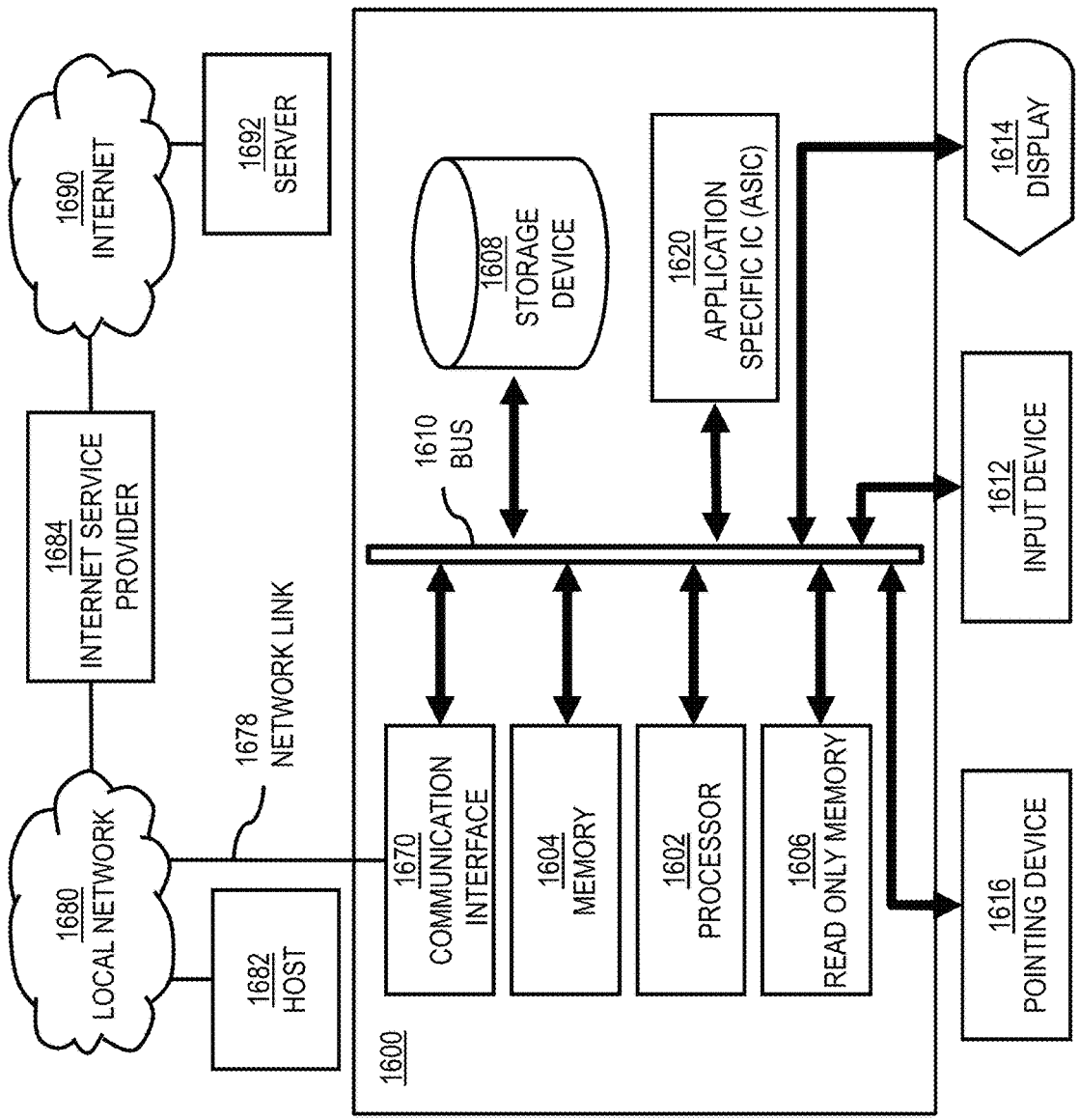
FIG. 16 is a diagram of hardware that can be used to implement an embodiment of the processes described herein.

FIG. 16 illustrates a computer system 1600 upon which an embodiment of the invention may be implemented. Computer system 1600 is programmed (e.g., via computer program code or instructions) to combine location data sources as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to combining location data sources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RANI) or other dynamic storage device, stores information including processor instructions for combining location data sources. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for combining location data sources, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners, and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic, or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 113 for combining location data sources.

The term computer-readable medium is used herein to refer to any medium that participates in providing information to processor 1602, including instructions for execution. Such a medium may take many forms, including, but not limited to, non-volatile media, volatile media, and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1678 typically provides information communication using transmission media through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690.

A computer called a server host 1692 connected to the Internet hosts a process that provides a service in response to information received over the Internet. For example, server host 1692 hosts a process that provides information representing video data for presentation at display 1614. It is contemplated that the components of system can be deployed in various configurations within other computer systems, e.g., host 1682 and server 1692.

FIG. 17 illustrates a chip set 1700 upon which an embodiment of the invention may be implemented. Chip set 1700 is programmed to combine location data sources as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to combine location data sources. The memory 1705 also stores the data associated with or generated by the execution of the inventive steps.

Figure 18:
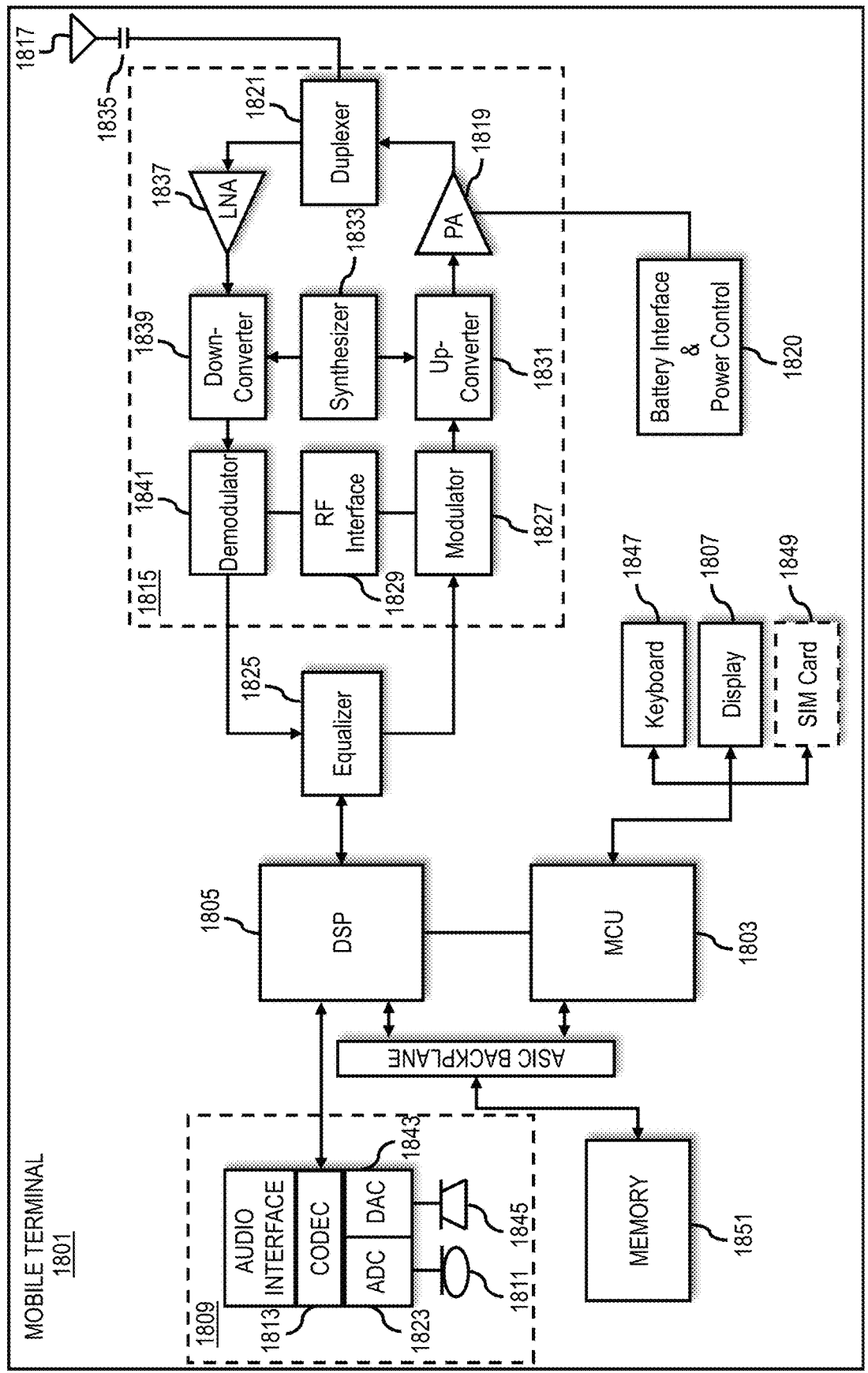
FIG. 18 is a diagram of a terminal that can be used to implement an embodiment of the processes described herein.

FIG. 18 is a diagram of exemplary components of a mobile terminal 1801 (e.g., a vehicle 133 and/or UE 135 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to combine location data sources. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
    creating a knowledge graph of a first location entity in a first data source and a second location entity in a second data source;
    generating a first context-aware vector representation of the first location entity and a second context-aware vector representation of the second location entity;
    processing the first context-aware vector representation and the second context-aware vector representation using a machine learning model to perform a classification of the first location entity as the same as the second location entity based on a threshold;
    combining the first data source and the second data source into a new database based on the classification; and
    providing the new database as an output.

2. The method of claim 1, wherein the knowledge graph encompasses the new database and includes a plurality of location entities, the plurality of location entities including the first location entity and the second location entity, the method further comprising:
    enriching the knowledge graph with multi-modal data; and
    creating a plurality of node embeddings to respectively represent the plurality of location entities based on the enriched knowledge graph.

3. The method of claim 2, further comprising:
    using another machine learning model to predict a relation between any two location entities of the new database based on the plurality of node embeddings.

4. The method of claim 3, wherein the relation is predicted based on a triple comprising a head entity and a tail entity selected from the plurality of location entities, and wherein the triple represents a statement that the head entity is related to the tail entity via the relation.

5. The method of claim 4, further comprising:
    generating one or more intermediate representations of the plurality of node embeddings associated with the triple based on one or more convolutions of the plurality of node embeddings associated with the triple,
    wherein the relation is predicted based, at least in part, on the one or more intermediate representations.

6. The method of claim 5, further comprising:
    adding one or more explicit features to the one or more intermediate representations for the another machine learning model to predict the relation.

7. The method of claim 6, wherein the one or more explicit features include an encoded node type, additional location data, or a combination thereof.

8. The method of claim 3, wherein the another machine learning model computes a prediction score that the relation is plausible with respect to a training knowledge graph.

9. The method of claim 3, wherein the relation is a provided as a prediction output based on evaluating the prediction score against a threshold score value.

10. The method of claim 1, wherein the first context-aware vector representation, the second context-aware vector representation, or a combination thereof is generated based on respective distributed text representations of the first location entity, the second location entity, or a combination thereof.

11. The method of claim 1, wherein the machine learning model is based on a linear regression classifier.

12. The method of claim 1, further comprising:
    sampling the first data source, the second data source, or a combination thereof to select a predetermined number of candidate location entities,
    wherein the first location entity, the second location entity, or a combination thereof is selected from the predetermined number of candidate location entities.

13. An apparatus comprising:
    at least one processor; and
    at least one memory including computer program code for one or more programs,
    the at least one memory and the computer program code configured to, within the at least one processor, cause the apparatus to perform at least the following,
        create a knowledge graph of a plurality of location entities of a database, wherein the database is created from combining a plurality of data sources using context-aware vector representations for matching the plurality of location entities;
        enrich the knowledge graph with multi-modal data;
        create a plurality of node embeddings to respectively represent the plurality of location entities based on the enriched knowledge graph;
        use a machine learning model to predict a relation between any two location entities of the database based on the plurality of node embeddings; and
        provide the relation as an output.

14. The apparatus of claim 13, wherein the relation is predicted based on a triple comprising a head entity and a tail entity selected from the plurality of location entities, and wherein the head entity is related to the tail entity via the relation.

15. The apparatus of claim 14, wherein the apparatus is further caused to:
    generate one or more intermediate representations of the plurality of node embeddings associated with the triple based on one or more convolutions of the plurality of node embeddings associated with the triple,
    wherein the relation is predicted based, at least in part, on the one or more intermediate representations.

16. The apparatus of claim 15, wherein the apparatus is further caused to:
    add one or more explicit features to the one or more intermediate representations for the machine learning model to predict the relation.

17. A non-transitory computer-readable storage medium carrying one or more sequences of one or more instructions which, when executed by one or more processors, cause an apparatus to perform:
    creating a knowledge graph of a first location entity in a first data source and a second location entity in a second data source;

generating a first context-aware vector representation of the first location entity and a second context-aware vector representation of the second location entity;

processing the first context-aware vector representation and the second context-aware vector representation using a machine learning model to perform a classification of the first location entity as the same as the second location entity based on a threshold;

combining the first data source and the second data source into a new database based on the classification; and providing the new database as an output.

18. The non-transitory computer-readable storage medium of claim 17, wherein the first context-aware vector representation, the second context-aware vector representation, or a combination thereof is generated based on respective distributed text representations of the first location entity, the second location entity, or a combination thereof.

19. The non-transitory computer-readable storage medium of claim 17, wherein the machine learning model is based on a linear regression classifier.

20. The non-transitory computer-readable storage medium of claim 17, wherein the apparatus is caused to further perform:

sampling the first data source, the second data source, or a combination thereof to select a predetermined number of candidate location entities, wherein the first location entity, the second location entity, or a combination thereof is selected from the predetermined number of candidate location entities.

\* \* \* \* \*